United States Patent
Aldana et al.

(10) Patent No.: US 12,439,235 B2
(45) Date of Patent: Oct. 7, 2025

(54) SYSTEMS AND METHODS FOR ULTRA-WIDEBAND IN-BAND DISCOVERY

(71) Applicant: Meta Platforms Technologies, LLC, Menlo Park, CA (US)

(72) Inventors: Carlos Horacio Aldana, Mountain View, CA (US); Kangjin Yoon, Menlo Park, CA (US); Chunyu Hu, Saratoga, CA (US); Kanji Mavji Kerai, London (GB)

(73) Assignee: Meta Platforms Technologies, LLC, Menlo Park, CA (US)

( * ) Notice: Subject to any disclaimer, the term of this patent is extended or adjusted under 35 U.S.C. 154(b) by 167 days.

(21) Appl. No.: 18/503,710

(22) Filed: Nov. 7, 2023

(65) Prior Publication Data
US 2024/0171961 A1    May 23, 2024

Related U.S. Application Data

(60) Provisional application No. 63/424,586, filed on Nov. 11, 2022, provisional application No. 63/448,796, filed on Feb. 28, 2023.

(51) Int. Cl.
  *H04W 8/00* (2009.01)
  *H04B 1/7163* (2011.01)
  *H04W 8/24* (2009.01)

(52) U.S. Cl.
  CPC ........ *H04W 8/005* (2013.01); *H04B 1/71632* (2013.01); *H04W 8/24* (2013.01)

(58) Field of Classification Search
  CPC ... H04W 8/005; H04W 8/24; H04W 28/0236; H04W 48/18; H04W 76/15; H04W 48/16; H04W 48/14; H04B 1/71632; H04B 7/024; H04B 1/7163; H04L 2001/0093
  See application file for complete search history.

(56) References Cited

U.S. PATENT DOCUMENTS

2022/0386227 A1* 12/2022 Sugaya ................. H04W 48/16
2024/0373242 A1* 11/2024 Nayak .................. H04W 16/14

* cited by examiner

*Primary Examiner* — Khanh C Tran
(74) *Attorney, Agent, or Firm* — Foley & Lardner LLP

(57) ABSTRACT

Systems and methods for ultra-wideband (UWB) in-band discovery may include a first UWB device which determines an availability for associations with potential controlees, and which generates and transmits an application control (AC) information element (IE) indicating the availability. A second UWB device may receive the AC IE, select an available slot for transmitting an association request to the first UWB device, and transmit the association request in the available slot. The first UWB device may receive the association request, generate an association response, and transmit the association response to the second UWB device.

20 Claims, 11 Drawing Sheets

SYSTEMS AND METHODS FOR ULTRA-WIDEBAND IN-BAND DISCOVERY

CROSS-REFERENCE TO RELATED APPLICATIONS

This application claims the benefit of and priority to U.S. Provisional Patent Application No. 63/448,796, filed Feb. 28, 2023, and U.S. Provisional Patent Application No. 63/424,586, filed Nov. 11, 2022, the contents of each of which are incorporated herein by reference in their entirety.

BACKGROUND

The development of ultra-wideband devices has shown promise in determining accurate ranging between devices. However, for multiple devices to concurrently operate in a shared environment, the devices should be synchronized.

SUMMARY

In one aspect, this disclosure is directed to a method. The method may include receiving, by a first ultra-wideband (UWB) device from a second UWB device, an application control (AC) information element (IE) including an association availability field having a value indicating availability of an association between the first UWB device and the second UWB device. The method may include selecting, by the first UWB device, an available slot in which to transmit an association request to the second UWB device. The method may include transmitting, by the first UWB device, the association request to the second UWB device in the available slot.

In some embodiments, the association request comprises a high-rate pulse repetition frequency (HRP) association request command, and the HRP association request may include a scheduling mode to be used for the association request. In some embodiments, the second UWB device remains in an active state for each slot including the available slot, responsive to providing the value in the association availability field. In some embodiments, the association request includes capability information of the first UWB device. In some embodiments, the capability information includes at least one of i) support for low density parity check (LDPC), ii) a data rate, or iii) an arbitration interframe space (AIFS). In some embodiments, the AIFS includes a field having an AIFS value corresponding to a supported AIFS comprising at least one of 64 µs, 32 µs, or 16 µs. In some embodiments, the capability information further includes at least one of i) multi-millisecond (MMS) ranging, ii) sensing, iii) downlink time difference of arrival (TDoA), or iv) uplink TDoA. In some embodiments, the method includes receiving, by the first UWB device, an association response from the second UWB device. In some embodiments, the association response includes a field having an association status value indicating at least one of i) a successful association, ii) session at capacity, or iii) a rejected short address of the first UWB device.

In another aspect, this disclosure is directed to a first device. The first device may include a first UWB transceiver and one or more processors configured to receive, via the first UWB transceiver from a second UWB transceiver of a second device, an application control (AC) information element (IE) including an association availability field having a value indicating availability of an association between the first device and the second device. The one or more processors may be configured to select an available slot in which to transmit an association request to the second device. The one or more processors may be configured to transmit, via the first UWB transceiver, then association request to the second device.

In some embodiments, the association request includes a high-rate pulse repetition frequency (HRP) association request command, and the HRP association request may include a scheduling mode to be used for the association request. In some embodiments, the second UWB transceiver of the second device remains in an active state for each slot including the available slot, responsive to providing the value in the association availability field.

In some embodiments, the association request includes capability information of the first device. In some embodiments, the capability information includes at least one of i) support for low density parity check (LDPC), ii) a data rate, or iii) an arbitration interframe space (AIFS). In some embodiments, the AIFS includes a field having an AIFS value corresponding to a supported AIFS comprising at least one of 64 µs, 32 µs, or 16 µs. In some embodiments, the capability information further includes at least one of i) multi-millisecond (MMS) ranging, ii) sensing, iii) downlink time difference of arrival (TDoA), or iv) uplink TDoA. In some embodiments, the one or more processors are further configured to receive, via the first UWB transceiver from the second UWB transceiver of the second device, an association response from the second device. In some embodiments, the association response includes a field having an association status value indicating at least one of i) a successful association, ii) session at capacity, or iii) a rejected short address of the first device.

In another aspect, this disclosure is directed to a method. The method may include transmitting, by a first ultra-wideband (UWB) device, an application control (AC) information element (IE) including an association availability field having a value indicating availability of an association with the first UWB device. The method may include receiving, by the first UWB device from a second UWB device, during an available slot, an association request transmitted by the second UWB device responsive to the AC IE. The method may include transmitting, by the first UWB device to the second UWB device, an association response to the second UWB device according to the association request.

In some embodiments, the method includes maintaining, by the first UWB device, according to the AC IE, an active state of the first UWB device for each available slot of a round for receipt of any association requests from second UWB devices.

BRIEF DESCRIPTION OF THE DRAWINGS

The accompanying drawings are not intended to be drawn to scale. Like reference numbers and designations in the various drawings indicate like elements. For purposes of clarity, not every component can be labeled in every drawing.

DETAILED DESCRIPTION

Figure 1:
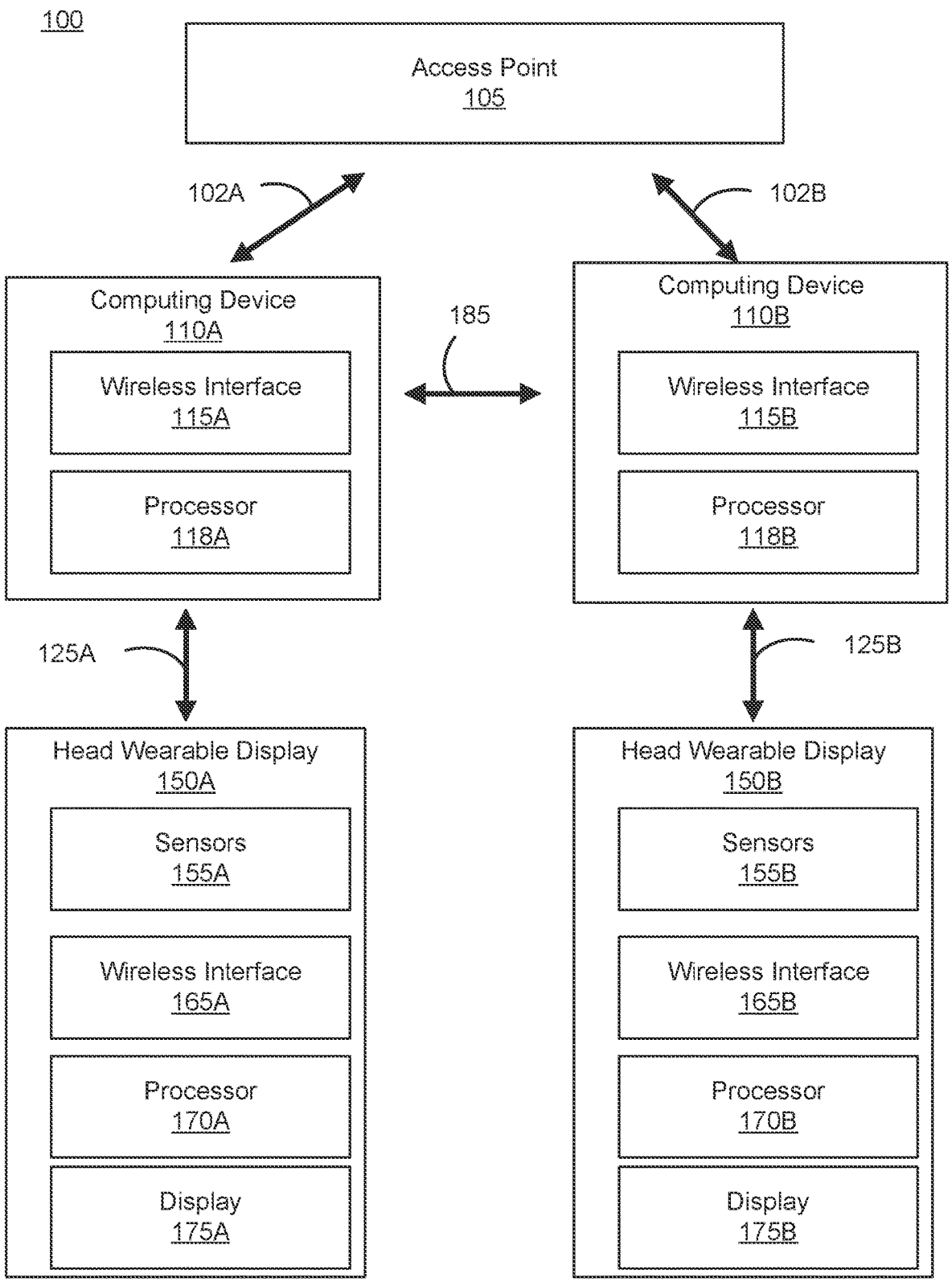
FIG. 1 is a diagram of a system environment including an artificial reality system, according to an example implementation of the present disclosure.
Figure 2:
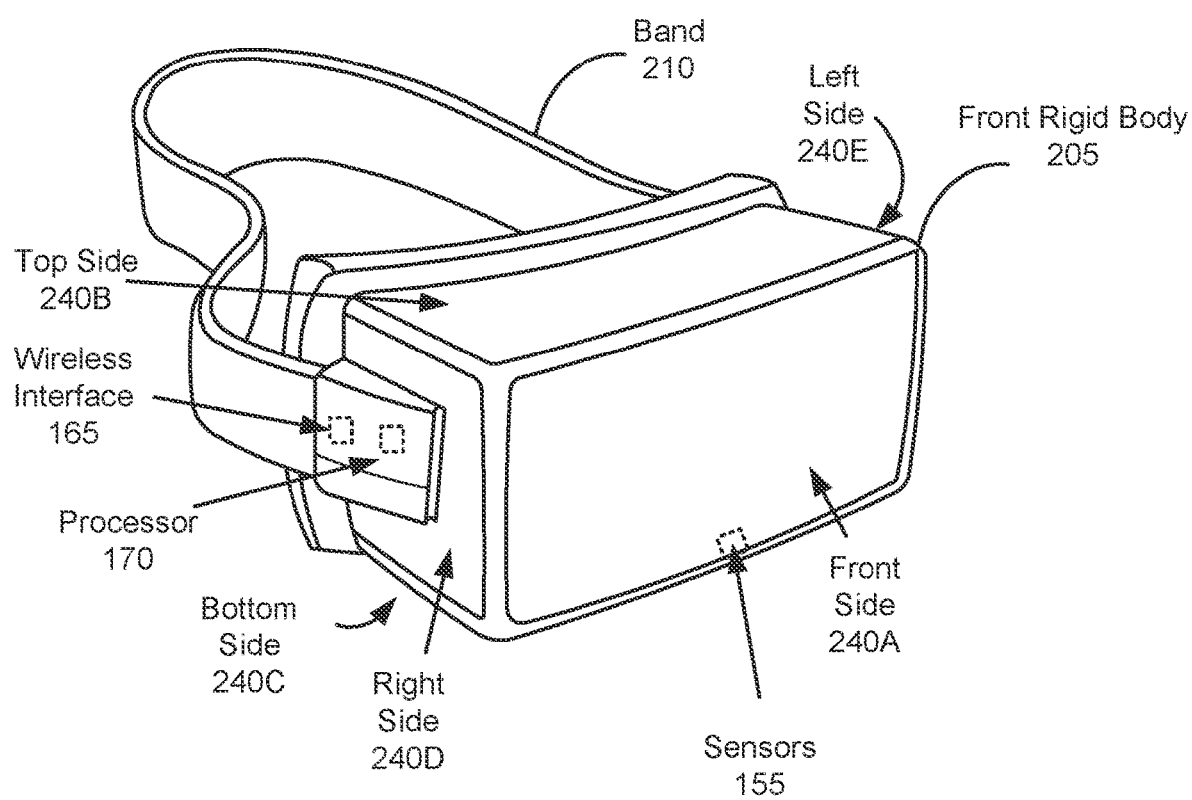
FIG. 2 is a diagram of a head wearable display, according to an example implementation of the present disclosure.

Before turning to the figures, which illustrate certain embodiments in detail, it should be understood that the present disclosure is not limited to the details or methodology set forth in the description or illustrated in the figures. It should also be understood that the terminology used herein is for the purpose of description only and should not be regarded as limiting.

Referring generally to the FIGURES, this disclosure is directed to systems and methods for ultra-wideband (UWB) in-band discovery. UWB devices may rely on BLU-ETOOTH low energy (BLE) for discovery and association. A UWB session may start when the devices discover each other via BLE. Some advantages of BLE scanning and/or beaconing may include power efficiency as compared to UWB. On the other hand, devices using BLE would entail having a BLE module, and there may be a delay for transition from BLE to UWB. For most use-cases, power efficiency may be critical, because the devices may use automatic service initiation (for example, passive car/door-lock access should happen without user intervention).

Some UWB services may involve active user participation. For example, a user of a first device may pick-up their hand controller and wear head-mount display device before using VR service. For such services, BLE may not be needed to continuously scan for nearby devices. Rather, a different input (e.g., button press, motion detection) can trigger UWB discovery protocol. Such implementations may be low cost and/or low latency, and may still benefit from power savings as a result of foregoing BLE scanning. Additionally, using in-band (e.g., UWB band) discovery protocol in various standards settings may not be feasible. For example, some legacy discovery protocols may be based on the superframe structure, which may not be compatible with block-based mode which is being used for most UWB applications. Beacon frames for such legacy discovery protocol may be additional overhead. Additionally, capability information in the Association Request frame may not reflect some UWB use-cases.

According to the systems and methods described herein, a device may utilize a control message (e.g., an application control (AC) information element (IE)) to indicate the presence of the session (instead of additional beacon frame) and utilize empty slots to receive an Association Request frames from controlees not yet discovered. An advantage of the present solution is that the block structure for discovery may be maintained (e.g., no superframe structure is needed), along with less overhead because the device is using the control message. The controller device may send an application control information element (IE) in the control message, including an association availability field in the IE. Where the association availability field is set to "1"—for example—the controller may remain awake for the remaining slots in the round to receive a possible association request from controlees not yet discovered. Controlees can select an empty slot in the round to send the association request frame (e.g., to avoid a collision). Upon receiving the association request frame from the controlee, the controller can schedule some slots in the next block for a session association procedure via a scheduling IE in the next control message.

In some implementations, controlees and controllers may use or utilize a short address in place of a unique extended address (e.g., 8 bytes). For example, a controlee can use the unique extended address for or as the sender address of an association request command. The controller can use the extended address for the receiver address of the association response command, and can assign a short address via the association response command. The controller and controlee can later use the assigned short address afterward. However, the extended address can be so long that it results in a reduced PHY rate (e.g., 1.95 Mbps), and a longer frame typically results in lower transmission power.

According to the systems and methods described herein, a controlee can send a high-rate pule repetition frequency (HRP) UWB association request command with a generated random short address. If the controller, upon receiving the response, determines that the short address is already being used for another controlee (which is unlikely, given the short address is 2 bytes, or $[1/2]^{16}$ probability of duplication), the controller may send an HRP UWB association response frame (e.g., to the controlee) with an association status of "short address duplication." On the other hand, where the short address is unique, the controller may send an HRP UWB association response frame with an association status of "association successful." If the controlee does not receive an HRP UWB association response frame with the status set to "association successful" or receives a response frame with the status set to "short address duplication," the controlee can use a new short address and repeat the same process.

Additional implementation details as well as advantages of the present disclosure are described in greater detail below.

Disclosed herein are embodiments related to devices operating in the ultra-wideband (UWB) spectrum. In various embodiments, UWB devices may operate in the 3-10 GHZ unlicensed spectrum, for example, and may use 500+ MHz channels. These channels may require low power for transmission. For example, the transmit power spectral density (PSD) for some devices may be limited to −41.3 dBm/MHz. On the other hand, UWB may have transmit PSD values in the range of −5 to +5 dBm/MHz range, averaged over 1 ms, with a peak power limit of 0 dBm in a given 50 MHz band. Using simple modulation and spread spectrum, UWB devices may achieve reasonable resistance to Wi-Fi and Bluetooth interference (as well as resistance to interference with other UWB devices within a shared or common environment) for very low data rates (e.g., 10s to 100s Kbps) and may have large processing gains. However, for higher data rates (e.g., several Mbps), the processing gains may not be sufficient to overcome co-channel interference from Wi-Fi or Bluetooth. According to the embodiments described herein, the systems and methods described herein may operate in frequency bands that do not overlap with Wi-Fi and Bluetooth, but may have good global availability based on regulatory requirements. Since regulatory requirements make the 7-8 GHz spectrum the most widely available globally (and Wi-Fi is not present in this spectrum), the 7-8 GHz spectrum may operate satisfactory both based on co-channel interference and processing gains.

Some implementations of UWB may focus on precision ranging, security, and low to moderate rate data communication. As UWB employs relatively simple modulation, it may be implemented at low cost and low power consumption. In AR/VR applications, link budget calculations for an AR/VR controller link indicate that the systems and methods described herein may be configured for effective data throughput ranging from ~2 to 31 Mbps (e.g., with 31 Mbps being the maximum possible rate in the latest 802.15.4z standard), which may depend on body loss assumptions. Using conservative body loss assumptions, the systems and methods described herein should be configured for data throughput of up to approximately 5 Mbps, which may be sufficient to meet the data throughput performance standards for AR/VR links. With a customized implementation, data throughput rate could be increased beyond 27 Mbps (e.g., to 54 Mbps), but with possible loss in link margin.

FIG. 1 is a block diagram of an example artificial reality system environment 100. In some embodiments, the artificial reality system environment 100 includes an access point (AP) 105, one or more HWDs 150 (e.g., HWD 150A, 150B), and one or more computing devices 110 (computing devices 110A, 110B; sometimes referred to as stage devices or consoles) providing data for artificial reality to the one or more HWDs 150. The access point 105 may be a router or any network device allowing one or more computing devices 110 and/or one or more HWDs 150 to access a network (e.g., the Internet). The access point 105 may be replaced by any communication device (cell site). A computing device 110 may be a custom device or a mobile device that can retrieve content from the access point 105, and provide image data of artificial reality to a corresponding HWD 150. Each HWD 150 may present the image of the artificial reality to a user according to the image data. In some embodiments, the artificial reality system environment 100 includes more, fewer, or different components than shown in FIG. 1. In some embodiments, the computing devices 110A, 110B communicate with the access point 105 through wireless links 102A, 102B (e.g., interlinks), respectively. In some embodiments, the computing device 110A communicates with the HWD 150A through a wireless link 125A (e.g., intralink), and the computing device 110B communicates with the HWD 150B through a wireless link 125B (e.g., intralink). In some embodiments, functionality of one or more components of the artificial reality system environment 100 can be distributed among the components in a different manner than is described here. For example, some of the functionality of the computing device 110 may be performed by the HWD 150. For example, some of the functionality of the HWD 150 may be performed by the computing device 110.

In some embodiments, the HWD 150 is an electronic component that can be worn by a user and can present or provide an artificial reality experience to the user. The HWD 150 may be referred to as, include, or be part of a head mounted display (HMD), head mounted device (HMD), head wearable device (HWD), head worn display (HWD) or head worn device (HWD). The HWD 150 may render one or more images, video, audio, or some combination thereof to provide the artificial reality experience to the user. In some embodiments, audio is presented via an external device (e.g., speakers and/or headphones) that receives audio information from the HWD 150, the computing device 110, or both, and presents audio based on the audio information. In some embodiments, the HWD 150 includes sensors 155, a wireless interface 165, a processor 170, and a display 175. These components may operate together to detect a location of the HWD 150 and a gaze direction of the user wearing the HWD 150, and render an image of a view within the artificial reality corresponding to the detected location and/or orientation of the HWD 150. In other embodiments, the HWD 150 includes more, fewer, or different components than shown in FIG. 1.

In some embodiments, the sensors 155 include electronic components or a combination of electronic components and software components that detects a location and an orientation of the HWD 150. Examples of the sensors 155 can include: one or more imaging sensors, one or more accelerometers, one or more gyroscopes, one or more magnetometers, or another suitable type of sensor that detects motion and/or location. For example, one or more accelerometers can measure translational movement (e.g., forward/back, up/down, left/right) and one or more gyroscopes can measure rotational movement (e.g., pitch, yaw, roll). In some embodiments, the sensors 155 detect the translational movement and the rotational movement, and determine an orientation and location of the HWD 150. In one aspect, the sensors 155 can detect the translational movement and the rotational movement with respect to a previous orientation and location of the HWD 150, and determine a new orientation and/or location of the HWD 150 by accumulating or integrating the detected translational movement and/or the rotational movement. Assuming for an example that the HWD 150 is oriented in a direction 25 degrees from a reference direction, in response to detecting that the HWD 150 has rotated 20 degrees, the sensors 155 may determine that the HWD 150 now faces or is oriented in a direction 45 degrees from the reference direction. Assuming for another example that the HWD 150 was located two feet away from a reference point in a first direction, in response to detecting that the HWD 150 has moved three feet in a second direction, the sensors 155 may determine that the HWD 150 is now located at a vector multiplication of the two feet in the first direction and the three feet in the second direction.

In some embodiments, the wireless interface 165 includes an electronic component or a combination of an electronic component and a software component that communicates with the computing device 110. In some embodiments, the wireless interface 165 includes or is embodied as a transceiver for transmitting and receiving data through a wireless medium. The wireless interface 165 may communicate with a wireless interface 115 of a corresponding computing device 110 through a wireless link 125 (e.g., intralink). The wireless interface 165 may also communicate with the access point 105 through a wireless link (e.g., interlink). Examples of the wireless link 125 include a near field communication link, Wi-Fi direct, Bluetooth, or any wireless communication link. In some embodiments, the wireless link 125 may include one or more ultra-wideband communication links, as described in greater detail below. Through the wireless link 125, the wireless interface 165 may transmit to the computing device 110 data indicating the determined location and/or orientation of the HWD 150, the determined gaze direction of the user, and/or hand tracking measurement. Moreover, through the wireless link 125, the wireless interface 165 may receive from the computing device 110 image data indicating or corresponding to an image to be rendered.

In some embodiments, the processor 170 includes an electronic component or a combination of an electronic component and a software component that generates one or more images for display, for example, according to a change in view of the space of the artificial reality. In some embodiments, the processor 170 is implemented as one or more graphical processing units (GPUs), one or more central processing unit (CPUs), or a combination of them that can execute instructions to perform various functions described herein. The processor 170 may receive, through the wireless interface 165, image data describing an image of artificial reality to be rendered, and render the image through the display 175. In some embodiments, the image data from the computing device 110 may be encoded, and the processor 170 may decode the image data to render the image. In some embodiments, the processor 170 receives, from the computing device 110 through the wireless interface 165, object information indicating virtual objects in the artificial reality space and depth information indicating depth (or distances from the HWD 150) of the virtual objects. In one aspect, according to the image of the artificial reality, object information, depth information from the computing device 110, and/or updated sensor measurements from the sensors 155, the processor 170 may perform shading, reprojection, and/or blending to update the image of the artificial reality to correspond to the updated location and/or orientation of the HWD 150.

In some embodiments, the display 175 is an electronic component that displays an image. The display 175 may, for example, be a liquid crystal display or an organic light emitting diode display. The display 175 may be a transparent display that allows the user to see through. In some embodiments, when the HWD 150 is worn by a user, the display 175 is located proximate (e.g., less than 3 inches) to the user's eyes. In one aspect, the display 175 emits or projects light towards the user's eyes according to image generated by the processor 170. The HWD 150 may include a lens that allows the user to see the display 175 in a close proximity.

In some embodiments, the processor 170 performs compensation to compensate for any distortions or aberrations. In one aspect, the lens introduces optical aberrations such as a chromatic aberration, a pin-cushion distortion, barrel distortion, etc. The processor 170 may determine a compensation (e.g., predistortion) to apply to the image to be rendered to compensate for the distortions caused by the lens, and apply the determined compensation to the image from the processor 170. The processor 170 may provide the predistorted image to the display 175.

In some embodiments, the computing device 110 is an electronic component or a combination of an electronic component and a software component that provides content to be rendered to the HWD 150. The computing device 110 may be embodied as a mobile device (e.g., smart phone, tablet PC, laptop, etc.). The computing device 110 may operate as a soft access point. In one aspect, the computing device 110 includes a wireless interface 115 and a processor 118. These components may operate together to determine a view (e.g., a FOV of the user) of the artificial reality corresponding to the location of the HWD 150 and the gaze direction of the user of the HWD 150, and can generate image data indicating an image of the artificial reality corresponding to the determined view. The computing device 110 may also communicate with the access point 105, and may obtain AR/VR content from the access point 105, for example, through the wireless link 102 (e.g., interlink). The computing device 110 may receive sensor measurement indicating location and the gaze direction of the user of the HWD 150 and provide the image data to the HWD 150 for presentation of the artificial reality, for example, through the wireless link 125 (e.g., intralink). In other embodiments, the computing device 110 includes more, fewer, or different components than shown in FIG. 1.

In some embodiments, the wireless interface 115 is an electronic component or a combination of an electronic component and a software component that communicates with the HWD 150, the access point 105, other computing device 110, or any combination of them. In some embodiments, the wireless interface 115 includes or is embodied as a transceiver for transmitting and receiving data through a wireless medium. The wireless interface 115 may be a counterpart component to the wireless interface 165 to communicate with the HWD 150 through a wireless link 125 (e.g., intralink). The wireless interface 115 may also include a component to communicate with the access point 105 through a wireless link 102 (e.g., interlink). Examples of wireless link 102 include a cellular communication link, a near field communication link, Wi-Fi, Bluetooth, 60 GHz wireless link, ultra-wideband link, or any wireless communication link. The wireless interface 115 may also include a component to communicate with a different computing device 110 through a wireless link 185. Examples of the wireless link 185 include a near field communication link, Wi-Fi direct, Bluetooth, ultra-wideband link, or any wireless communication link. Through the wireless link 102 (e.g., interlink), the wireless interface 115 may obtain AR/VR content, or other content from the access point 105. Through the wireless link 125 (e.g., intralink), the wireless interface 115 may receive from the HWD 150 data indicating the determined location and/or orientation of the HWD 150, the determined gaze direction of the user, and/or the hand tracking measurement. Moreover, through the wireless link 125 (e.g., intralink), the wireless interface 115 may transmit to the HWD 150 image data describing an image to be rendered. Through the wireless link 185, the wireless interface 115 may receive or transmit information indicating the wireless link 125 (e.g., channel, timing) between the computing device 110 and the HWD 150. According to the information indicating the wireless link 125, computing devices 110 may coordinate or schedule operations to avoid interference or collisions.

The processor 118 can include or correspond to a component that generates content to be rendered according to the location and/or orientation of the HWD 150. In some embodiments, the processor 118 includes or is embodied as one or more central processing units, graphics processing units, image processors, or any processors for generating images of the artificial reality. In some embodiments, the processor 118 may incorporate the gaze direction of the user of the HWD 150 and a user interaction in the artificial reality to generate the content to be rendered. In one aspect, the processor 118 determines a view of the artificial reality according to the location and/or orientation of the HWD 150. For example, the processor 118 maps the location of the HWD 150 in a physical space to a location within an artificial reality space, and determines a view of the artificial reality space along a direction corresponding to the mapped orientation from the mapped location in the artificial reality space. The processor 118 may generate image data describing an image of the determined view of the artificial reality space, and transmit the image data to the HWD 150 through the wireless interface 115. The processor 118 may encode the image data describing the image, and can transmit the encoded data to the HWD 150. In some embodiments, the processor 118 generates and provides the image data to the HWD 150 periodically (e.g., every 11 ms or 16 ms).

In some embodiments, the processors 118, 170 may configure or cause the wireless interfaces 115, 165 to toggle, transition, cycle or switch between a sleep mode and a wake up mode. In the wake up mode, the processor 118 may enable the wireless interface 115 and the processor 170 may enable the wireless interface 165, such that the wireless interfaces 115, 165 may exchange data. In the sleep mode, the processor 118 may disable (e.g., implement low power operation in) the wireless interface 115 and the processor 170 may disable the wireless interface 165, such that the wireless interfaces 115, 165 may not consume power or may reduce power consumption. The processors 118, 170 may schedule the wireless interfaces 115, 165 to switch between the sleep mode and the wake up mode periodically every frame time (e.g., 11 ms or 16 ms). For example, the wireless interfaces 115, 165 may operate in the wake up mode for 2 ms of the frame time, and the wireless interfaces 115, 165 may operate in the sleep mode for the remainder (e.g., 9 ms) of the frame time. By disabling the wireless interfaces 115, 165 in the sleep mode, power consumption of the computing device 110 and the HWD 150 can be reduced.

In various embodiments, the devices in the environments described above may operate or otherwise use components which leverage communications in the ultra-wideband (UWB) spectrum. In various embodiments, UWB devices operate in the 3-10 GHz unlicensed spectrum using 500+ MHz channels which may require low power for transmission. For example, the transmit power spectral density (PSD) for some systems may be limited to −41.3 dBm/MHz. On the other hand, UWB may have transmit PSD values in the range of −5 to +5 dBm/MHz range, averaged over 1 ms, with a peak power limit of 0 dBm in a given 50 MHZ band. Using simple modulation and spread spectrum, UWB devices may achieve reasonable resistance to Wi-Fi and Bluetooth interference (as well as resistance to interference with other UWB devices located in the environment) for very low data rates (e.g., 10s to 100s Kbps) and may have large processing gains. However, for higher data rates (e.g., several Mbps), the processing gains may not be sufficient to overcome co-channel interference from Wi-Fi or Bluetooth. According to the embodiments described herein, the systems and methods described herein may operate in frequency bands that do not overlap with Wi-Fi and Bluetooth, but may have good global availability based on regulatory requirements. Since regulatory requirements make the 7-8 GHz spectrum the most widely available globally (and Wi-Fi is not present in this spectrum), the 7-8 GHz spectrum may operate satisfactory both based on co-channel interference and processing gains.

Figure 3:
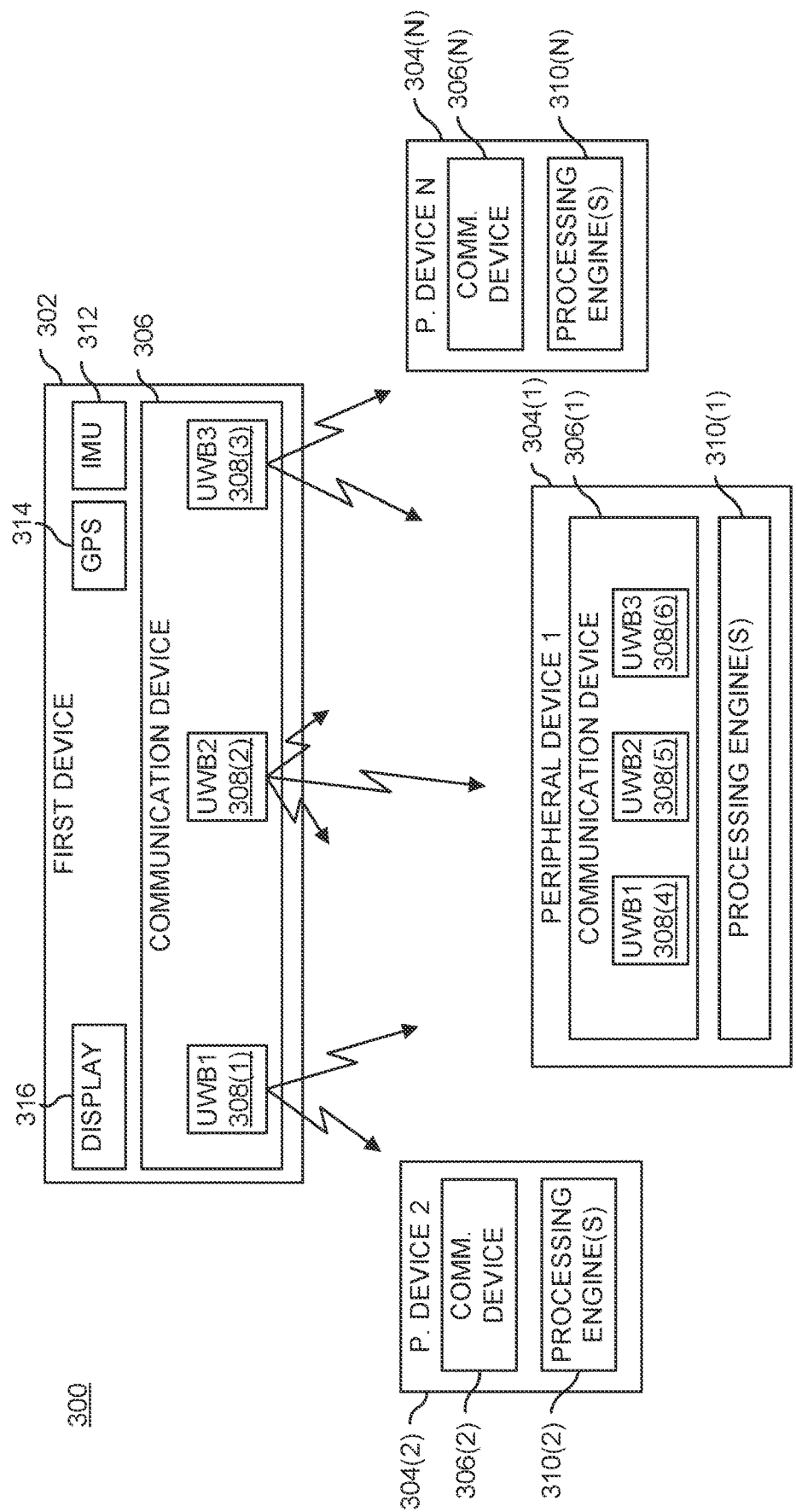
FIG. 3 is a block diagram of an artificial reality environment, according to an example implementation of the present disclosure.

Some implementations of UWB may focus on precision ranging, security, and for low-to-moderate rate data communication. As UWB employs relatively simple modulation, it may be implemented at low cost and low power consumption. In AR/VR applications (or in other applications and use cases), link budget calculations for an AR/VR controller link indicate that the systems and methods described herein may be configured for effective data throughput ranging from ~2 to 31 Mbps (e.g., with 31 Mbps being the maximum possible rate in the latest 802.15.4z standard), which may depend on body loss assumptions Referring now to FIG. 3, depicted is a block diagram of an artificial reality environment 300. The artificial reality environment 300 is shown to include a first device 302 and one or more peripheral devices 304(1)-304(N) (also referred to as "peripheral device 304" or "device 304"). The first device 302 and peripheral device(s) 304 may each include a communication device 306 including a plurality of UWB devices 308. A set of UWB devices 308 may be spatially positioned/located (e.g., spaced out) relative to each other on different locations on/in the first device 302 or the peripheral device 304, so as to maximize UWB coverage and/or to enhance/enable specific functionalities. The UWB devices 308 may be or include antennas, sensors, or other devices and components designed or implemented to transmit and receive data or signals in the UWB spectrum (e.g., between 3.1 GHz and 10.6 GHZ) and/or using UWB communication protocol. In some embodiments, one or more of the devices 302, 304 may include various processing engines 310. The processing engines 310 may be or include any device, component, machine, or other combination of hardware and software designed or implemented to control the devices 302, 304 based on UWB signals transmitted and/or received by the respective UWB devices 308.

As noted above, the environment 300 may include a first device 302. The first device 302 may be or include a wearable device, such as the HWD 150 described above, a smart watch, AR glasses, or the like. In some embodiments, the first device 302 may include a mobile device (e.g., a smart phone, tablet, stage/console device, or other computing device). The first device 302 may be communicably coupled with various other devices 304 located in the environment 300. For example, the first device 302 may be communicably coupled to one or more of the peripheral devices 304 located in the environment 300. The peripheral devices 304 may be or include the computing device 110 described above, a device similar to the first device 302 (e.g., a HWD 150, a smart watch, mobile device, etc.), an automobile or other vehicle, a beacon transmitting device located in the environment 300, a smart home device (e.g., a smart television, a digital assistant device, a smart speaker, etc.), a smart tag configured for positioning on various devices, etc. In some embodiments, the first device 302 may be associated with a first entity or user and the peripheral devices 304 may be associated with a second entity or user (e.g., a separate member of a household, or a person/entity unrelated to the first entity).

In some embodiments, the first device 302 may be communicably coupled with the peripheral device(s) 304 following a pairing or handshaking process. For example, the first device 302 may be configured to exchange handshake packet(s) with the peripheral device(s) 304, to pair (e.g., establish a specific or dedicated connection or link between) the first device 302 and the peripheral device 304. The handshake packet(s) may be exchanged via the UWB devices 308, or via another wireless link 125 (such as one or more of the wireless links 125 described above). Following pairing, the first device 302 and peripheral device(s) 304 may be configured to transmit, receive, or otherwise exchange UWB data or UWB signals using the respective UWB devices 308 on the first device 302 and/or peripheral device 304. In some embodiments, the first device 302 may be configured to establish a communications link with a peripheral device 304 (e.g., without any device pairing). For example, the first device 302 may be configured to detect, monitor, and/or identify peripheral devices 304 located in the environment using UWB signals received from the peripheral devices 304 within a certain distance of the first device 302, by identifying peripheral devices 304 which are connected to a shared Wi-Fi network (e.g., the same Wi-Fi network to which the first device 302 is connected), etc. In these and other embodiments, the first device 302 may be configured to transmit, send, receive, or otherwise exchange UWB data or signals with the peripheral device 304.

Figure 4:
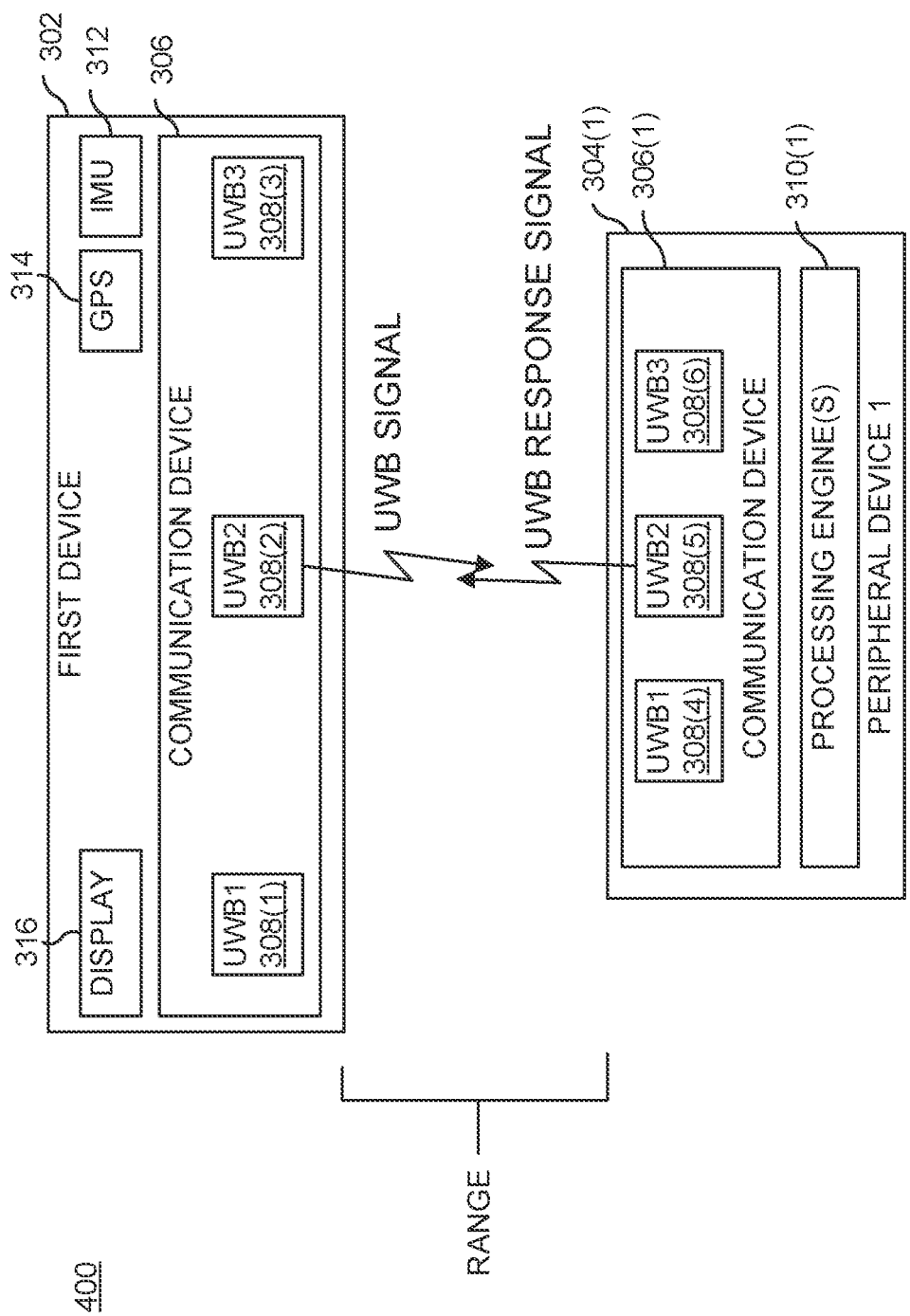
FIG. 4 is a block diagram of another artificial reality environment, according to an example implementation of the present disclosure.

Referring now to FIG. 4, depicted is a block diagram of an environment 400 including the first device 302 and a peripheral device 304. The first device 302 and/or the peripheral device 304 may be configured to determine a range (e.g., a spatial distance, separation) between the devices 302, 304. The first device 302 may be configured to send, broadcast, or otherwise transmit a UWB signal (e.g., a challenge signal). The first device 302 may transmit the UWB signal using one of the UWB devices 308 of the communication device 306 on the first device 302. The UWB device 308 may transmit the UWB signal in the UWB spectrum. The UWB signal may have a high bandwidth (e.g., 500 MHZ). As such, the UWB device 308 may be configured to transmit the UWB signal in the UWB spectrum (e.g., between 3.1 GHz and 10.6 GHZ) and having a high bandwidth (e.g., 500 MHZ). The UWB signal from the first device 302 may be detectable by other devices within a certain range of the first device 302 (e.g., devices having a line of sight (LOS) within 200 m of the first device 302). As such, the UWB signal may be more accurate for detecting range between devices than other types of signals or ranging technology.

The peripheral device 304 may be configured to receive or otherwise detect the UWB signal from the first device 302. The peripheral device 304 may be configured to receive the UWB signal from the first device 302 via one of the UWB devices 308 on the peripheral device 304. The peripheral device 304 may be configured to broadcast, send, or otherwise transmit a UWB response signal responsive to detecting the UWB signal from the first device 302. The peripheral device 304 may be configured to transmit the UWB response signal using one of the UWB devices 308 of the communication device 306 on the peripheral device 304. The UWB response signal may be similar to the UWB signal sent from the first device 302.

The first device 302 may be configured to detect, compute, calculate, or otherwise determine a time of flight (TOF) based on the UWB signal and the UWB response signal. The TOF may be a time or duration between a time in which a signal (e.g., the UWB signal) is transmitted by the first device 302 and a time in which the signal is received by the peripheral device 304. The first device 302 and/or the peripheral device 304 may be configured to determine the TOF based on timestamps corresponding to the UWB signal. For example, the first device 302 and/or peripheral device 304 may be configured to exchange transmit and receive timestamps based on when the first device 302 transmits the UWB signal (a first TX timestamp), when the peripheral device receives the UWB signal (e.g., a first RX timestamp), when the peripheral device sends the UWB response signal (e.g., a second TX timestamp), and when the first device 302 receives the UWB response signal (e.g., a second RX timestamp). The first device 302 and/or the peripheral device 304 may be configured to determine the TOF based on a first time in which the first device 302 sent the UWB signal and a second time in which the first device 302 received the UWB response signal (e.g., from the peripheral device 304), as indicated by first and second TX and RX timestamps identified above. The first device 302 may be configured to determine or calculate the TOF between the first device 302 and the peripheral device 304 based on a difference between the first time and the second time (e.g., divided by two).

In some embodiments, the first device 302 may be configured to determine the range (or distance) between the first device 302 and the peripheral device 304 based on the TOF. For example, the first device 302 may be configured to compute the range or distance between the first device 302 and the peripheral device 304 by multiplying the TOF and the speed of light (e.g., TOF× c). In some embodiments, the peripheral device 304 (or another device in the environment 400) may be configured to compute the range or distance between the first device 302 and peripheral device 304. For example, the first device 302 may be configured to transmit, send, or otherwise provide the TOF to the peripheral device 304 (or other device), and the peripheral device 304 (or other device) may be configured to compute the range between the first device 302 and peripheral device 304 based on the TOF, as described above.

Figure 5:
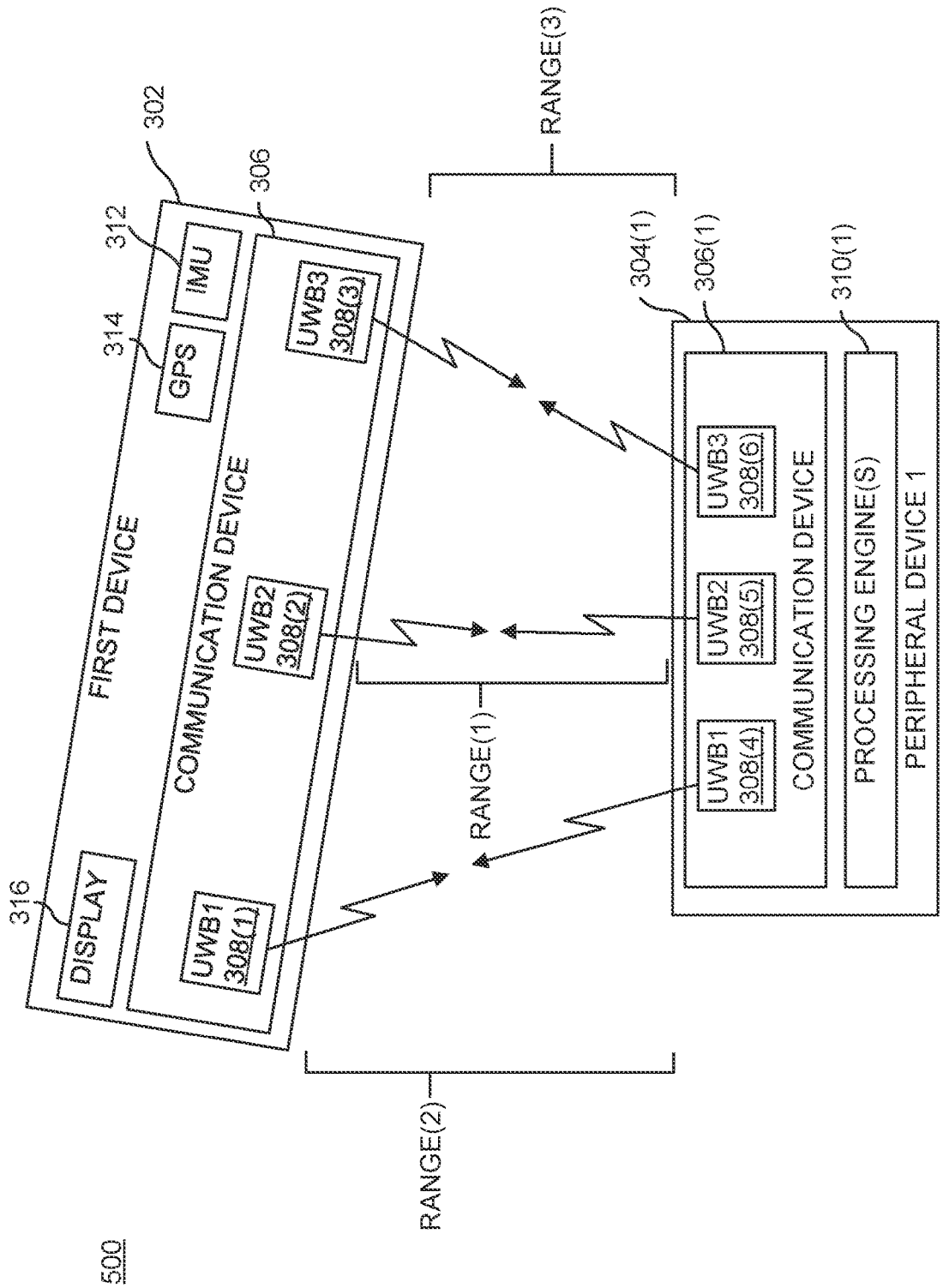
FIG. 5 is a block diagram of another artificial reality environment, according to an example implementation of the present disclosure.

Referring now to FIG. 5, depicted is a block diagram of an environment 500 including the first device 302 and a peripheral device 304. In some embodiments, the first device 302 and/or the peripheral device 304 may be configured to determine a position or pose (e.g., orientation) of the first device 302 relative to the peripheral device 304. The first device 302 and/or the peripheral device 304 may be configured to determine the relative position or orientation in a manner similar to determining the range as described above. For example, the first device 302 and/or the peripheral device 304 may be configured to determine a plurality of ranges (e.g., range(1), range(2), and range(3)) between the respective UWB devices 308 of the first device 302 and the peripheral device 304. In the environment 500 of FIG. 5, the first device 302 is positioned or oriented at an angle relative to the peripheral device 304. The first device 302 may be configured to compute the first range (range(1)) between central UWB devices 308(2), 308(5) of the first and peripheral device 304. The first range may be an absolute range or distance between the devices 302, 304, and may be computed as described above with respect to FIG. 4.

The first device 302 and/or the peripheral device 304 may be configured to compute the second range(2) and third range(3) similar to computing the range(1), In some embodiments, the first device 302 and/or the peripheral device 304 may be configured to determine additional ranges, such as a range between UWB device 308(1) of the first device 302 and UWB device 308(5) of the peripheral device 304, a range between UWB device 308(2) of the first device 302 and UWB device 308(6) of the peripheral device 304, and so forth. While described above as determining a range based on additional UWB signals, it is noted that, in some embodiments, the first device 302 and/or the peripheral device 304 may be configured to determine a phase difference between a UWB signal received at a first UWB device 308 and a second UWB device 308 (i.e., the same UWB signal received at separate UWB devices 308 on the same device 302, 304). The first device 302 and/or the peripheral device 304 may be configured to use each or a subset of the computed ranges (or phase differences) to determine the pose, position, orientation, etc. of the first device 302 relative to the peripheral device 304. For example, the first device and/or the peripheral device 304 may be configured to use one of the ranges relative to the first range(1) (or phase differences) to determine a yaw of the first device 302 relative to the peripheral device 304, another one of the ranges relative to the first range(1) (or phase differences) to determine a pitch of the first device 302 relative to the peripheral device 304, another one of the ranges relative to the first range(1) (or phase differences) to determine a roll of the first device 302 relative to the peripheral device 304, and so forth.

By using the UWB devices 308 at the first device 302 and peripheral devices 304, the range and pose may be determined with greater accuracy than other ranging/wireless link technologies. For example, the range may be determined within a granularity or range of +/−0.1 meters, and the pose/orientation may be determined within a granularity or range of +/−5 degrees.

Referring to FIG. 3-FIG. 5, in some embodiments, the first device 302 may include various sensors and/or sensing systems. For example, the first device 302 may include an inertial measurement unit (IMU) sensor 312, global positioning system (GPS) 314, etc. The sensors and/or sensing systems, such as the IMU sensor 312 and/or GPS 314 may be configured to generate data corresponding to the first device 302. For example, the IMU sensor 312 may be configured to generate data corresponding to an absolute position and/or pose of the first device 302. Similarly, the GPS 314 may be configured to generate data corresponding to an absolute location/position of the first device 302. The data from the IMU sensor 312 and/or GPS 314 may be used in conjunction with the ranging/position data determined via the UWB devices 308 as described above. In some embodiments, the first device 302 may include a display 316. The display 316 may be integrated or otherwise incorporated in the first device 302. In some embodiments, the display 316 may be separate or remote from the first device 302. The display 316 may be configured to display, render, or otherwise provide visual information to a user or wearer of the first device 302, which may be rendered at least in part on the ranging/position data of the first device 302.

Figure 6:
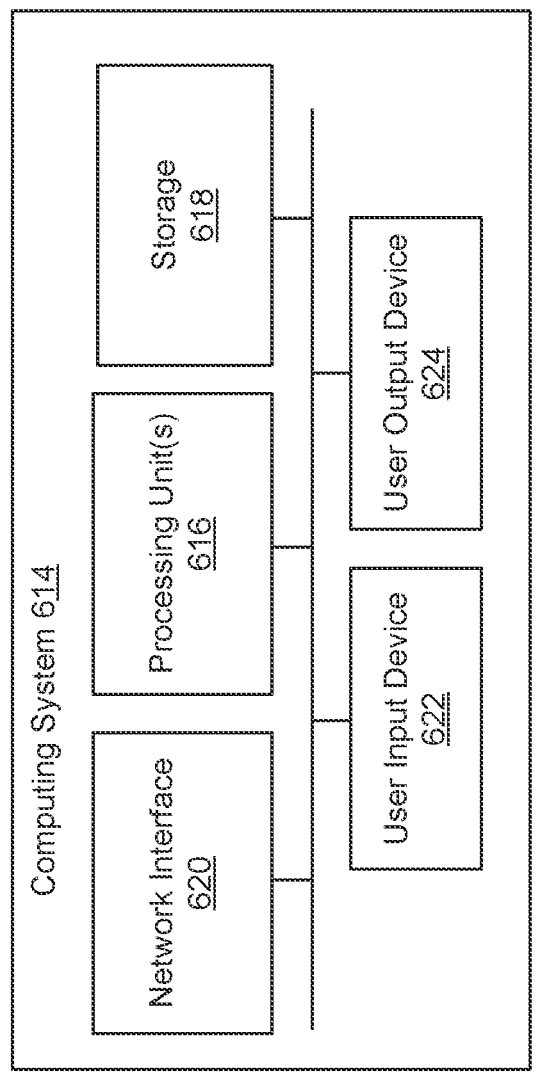
FIG. 6 is a block diagram of a computing environment, according to an example implementation of the present disclosure.

Various operations described herein can be implemented on computer systems. FIG. 6 shows a block diagram of a representative computing system 614 usable to implement the present disclosure. In some embodiments, the computing device 110, the HWD 150, devices 302, 304, or each of the components of FIG. 1-5 are implemented by or may otherwise include one or more components of the computing system 614. Computing system 614 can be implemented, for example, as a consumer device such as a smartphone, other mobile phone, tablet computer, wearable computing device (e.g., smart watch, eyeglasses, head wearable display), desktop computer, laptop computer, or implemented with distributed computing devices. The computing system 614 can be implemented to provide VR. AR, MR experience. In some embodiments, the computing system 614 can include conventional computer components such as processors 616, storage device 618, network interface 620, user input device 622, and user output device 624.

Network interface 620 can provide a connection to a wide area network (e.g., the Internet) to which WAN interface of a remote server system is also connected. Network interface 620 can include a wired interface (e.g., Ethernet) and/or a wireless interface implementing various RF data communication standards such as Wi-Fi, Bluetooth, UWB, or cellular data network standards (e.g., 3G, 4G, 5G, 60 GHz, LTE, etc.).

User input device 622 can include any device (or devices) via which a user can provide signals to computing system 614; computing system 614 can interpret the signals as indicative of particular user requests or information. User input device 622 can include any or all of a keyboard, touch pad, touch screen, mouse or other pointing device, scroll wheel, click wheel, dial, button, switch, keypad, microphone, sensors (e.g., a motion sensor, an eye tracking sensor, etc.), and so on.

User output device 624 can include any device via which computing system 614 can provide information to a user. For example, user output device 624 can include a display to display images generated by or delivered to computing system 614. The display can incorporate various image generation technologies, e.g., a liquid crystal display (LCD), light-emitting diode (LED) including organic light-emitting diodes (OLED), projection system, cathode ray tube (CRT), or the like, together with supporting electronics (e.g., digital-to-analog or analog-to-digital converters, signal processors, or the like). A device such as a touchscreen that function as both input and output device can be used. Output devices 624 can be provided in addition to or instead of a display. Examples include indicator lights, speakers, tactile "display" devices, printers, and so on.

Some implementations include electronic components, such as microprocessors, storage and memory that store computer program instructions in a computer readable storage medium (e.g., non-transitory computer readable medium). Many of the features described in this specification can be implemented as processes that are specified as a set of program instructions encoded on a computer readable storage medium. When these program instructions are executed by one or more processors, they cause the processors to perform various operation indicated in the program instructions. Examples of program instructions or computer code include machine code, such as is produced by a compiler, and files including higher-level code that are executed by a computer, an electronic component, or a microprocessor using an interpreter. Through suitable programming, processor 616 can provide various functionality for computing system 614, including any of the functionality described herein as being performed by a server or client, or other functionality associated with message management services.

It will be appreciated that computing system 614 is illustrative and that variations and modifications are possible. Computer systems used in connection with the present disclosure can have other capabilities not specifically described here. Further, while computing system 614 is described with reference to particular blocks, it is to be understood that these blocks are defined for convenience of description and are not intended to imply a particular physical arrangement of component parts. For instance, different blocks can be located in the same facility, in the same server rack, or on the same motherboard. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Implementations of the present disclosure can be realized in a variety of apparatus including electronic devices implemented using any combination of circuitry and software.

Figure 7:
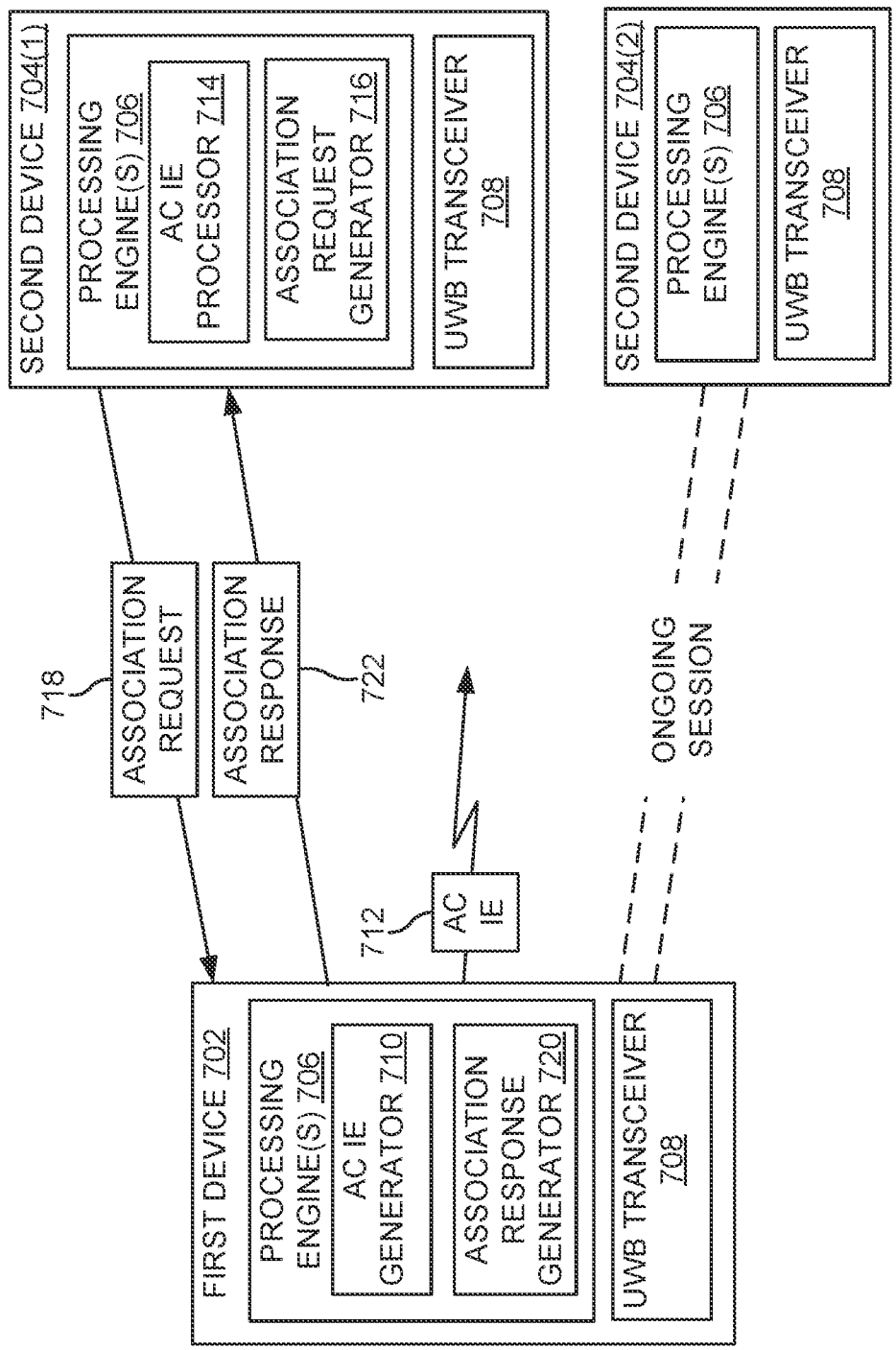
FIG. 7 is a block diagram of a system for ultra-wideband in-band discovery, according to an example implementation of the present disclosure.

Referring to FIG. 7, depicted is a block diagram of a system 700 for ultra-wideband in-band discovery, according to an example implementation of the present disclosure. The system 700 may include a first device 702 and one or more second devices 704(1), 704(2) (referred to generally as "second device 704" or "second device(s) 704"). The first device 702 and second devices 704 may be similar to the first device 302 and peripheral device(s) 304 described above with reference to FIG. 3 through FIG. 5. Each device 702, 704 may include respective processing engines 706 and ultra-wideband (UWB) transceivers 708. The processing engines 706 may be similar to the processing engines 310 described above with reference to FIG. 3 through FIG. 5. The UWB transceivers 708 may be similar to the communication device 306 including antenna(s) 308 described above with reference to FIG. 3 through FIG. 5. In some embodiments, the first device 702 may be a controller device, and the second device(s) 704 may be controlee devices.

In various instances, the first device 702 may have ongoing session(s) with one or more second devices 704, where such ongoing session(s) are established as described herein. Another second device 704(1), e.g., upon switching to an active state, being powered on, and so forth, may attempt to establish a session with the first device 702. The second device 704(1) may be configured to discover the first device 702, to establish the session with the first device 702, using the in-band device discovery components, steps, and methods described herein. As described in greater detail below, the first device 702 (e.g., controller device) may be configured to determine an availability for additional association (s) with controlee device(s). The first device 702 may be configured to establish, generate, or otherwise configure an application control (AC) information element (IE) 712 based on the availability for additional associations. The AC IE 712 may be configured to signal (e.g., to controlee(s)) whether any additional associations are available with the first device 702. The first device 702 may be configured to broadcast, communicate, send, share, or otherwise transmit the AC IE 712 (e.g., during a round). The second device 704 may be configured to receive the AC IE 712, and can generate an association request 718 to establish the session with the first device 702. The second device 702 may be configured to transmit the association request 718 in an available slot (e.g., of the round) to the first device 702. Upon receiving the association request 718, the first device 702 may be configured to generate and transmit an association response to the second device 704.

The first device 702 and second device(s) 704 may include one or more processing engines 706. The processing engine(s) 706 may be or include any device, component, element, or hardware designed or configured to perform various steps or functions as described herein. For example, the first device 702 may include an AC IE generator 710 and an association response generator 720, and the second device(s) 704 may include an AC IE processor 714 and an association request generator 716. While shown as including different processing engines 706, it should be understood that, in various embodiments, the devices 702, 704 may each include instances of each of the processing engines described herein. For example, the first device 702 may also include an AC IE processor 714 and association request generator 716, and the second device 704 may include an AC IE generator 710 and an association response generator 720. As such, the present disclosure is not limited to the particular arrangement shown in FIG. 7, which is illustrated for purposes of demonstrating processing engines maintained by a controller device and a controlee device. Further, in various embodiments, while shown as separate processing engines 706, in various embodiments, one or more of the processing engine(s) 706 shown in FIG. 7 may be combined into a single processing engine, or a processing engine 706 may be separated into multiple processing engines.

The first device 702 may include an AC IE generator 710. The AC IE generator 710 may be or include any device, component, element, or hardware designed or configured to generate, establish, create, produce, or otherwise configure an AC IE 712. The AC IE generator 710 may be configured to determine an availability of associations with the first device 702. In some embodiments, the AC IE generator 710 may be configured to determine the availability based on currently used resources of the first device 702. For example, the AC IE generator 710 may be configured to determine the availability based on whether any sessions have been currently established, and the resources currently used by such sessions (e.g., number of slots assigned to a particular session during a given round, total bandwidth allocated to current sessions, currently used functionalities or capabilities of the first device 702, etc.). The AC IE generator 710 may be configured to determine that one or more additional associations with a potential controlee are available, responsive to the available resources satisfying one or more criterion (e.g., one or more available slots, for example). Conversely, the AC IE generator 710 may be configured to determine that no further associations are available responsive to the available resources not satisfying the one or more criterion (e.g., no available slots).

Figure 8:
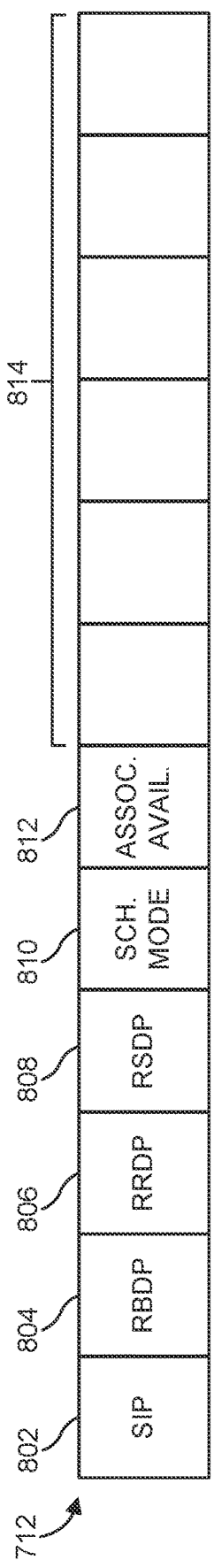
FIG. 8 is a diagram showing an example frame structure of an application control information element (AC IE) sent by a controller of the system of FIG. 7, according to an example implementation of the present disclosure.

Referring to FIG. 7 and FIG. 8, the AC IE generator 710 may be configured to generate an AC IE 712 having a frame format as shown in FIG. 8. Specifically, FIG. 8 is a diagram showing an example frame structure of a portion of an AC IE 712, according to an example implementation of the present disclosure. The AC IE 712 may include various fields for providing values corresponding to a content control of the AC IE 712. In other words, the AC IE 712 may include at least some of the fields shown in FIG. 8, as well as additional fields which are not shown (such as session identifier fields, block and round durations, slot durations, etc.) for purposes of brevity. As shown in FIG. 8, the AC IE 712 may include a plurality of presence fields 802-808 indicating a presence of various corresponding fields in the AC IE 712 (e.g., a session ID presence (SIP) field 802 indicating a presence of a session ID in the AC IE 712, a ranging block duration presence (RBDP) field 804 indicating a presence of a ranging block duration in the AC IE 712, a ranging round duration presence (RRDP) field 806 indicating a presence of a ranging round duration in the AC IE 712, and a ranging slot duration presence (RSDP) field 808 indicating a presence of a ranging slot duration in the AC IE 712). The AC IE 712 may include additional field(s) 814, including control presence fields for indicating whether control fields are present for various other functionalities or capabilities which may be used between devices 702, 704 as part of their respective sessions, such as ranging control fields, data communication control fields, sensing control fields, time difference of arrival (TDoA) control fields, and so forth. The AC IE 712 may further include a reserved fields for various reserved bits.

The AC IE 712 may include a scheduling mode field 810 and an association availability field 812. The scheduling mode field 810 may be a field which indicates a type of scheduling to be used for the session. For example, the scheduling mode field 810 may include a value indicating whether or not contention-based access is to be used. The association availability field 812 may be a field which indicates whether the controller device (e.g., the first device 702) is available for any additional association(s) with controlee device(s) (e.g., second device(s) 704). The AC IE generator 710 may be configured to set a value for the association availability field 812 based on or according to the availability determined by the first device. For example, the AC IE generator 710 may be configured to set the value for the association availability field 812 to high (or "1") where the first device 702 is available for additional association(s), and may be configured to set the value to low (or "0") where the first device 702 is not available for an additional association.

Figure 9:
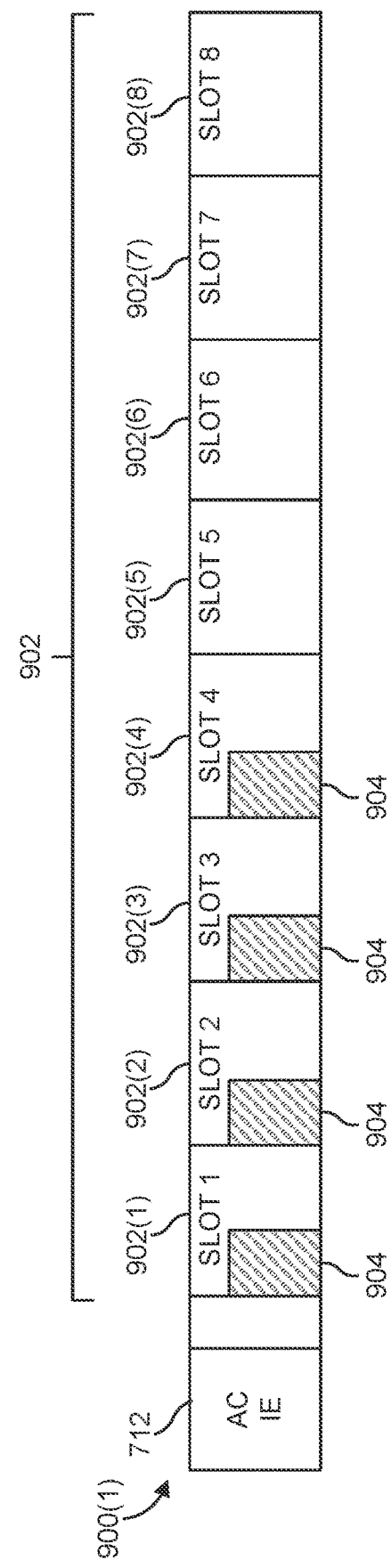
FIG. 9 is a diagram showing a first example round of slots of the controller including the AC IE, according to an example implementation of the present disclosure.

Referring now to FIG. 7 and FIG. 9, the first device 702 may be configured to communicate, share, broadcast, or otherwise transmit the AC IE 712 during a round (e.g., via the UWB transceiver 708 of the first device 702). Specifically, FIG. 9 shows an example of a first round 900 of slots 902 of the first device 702 (e.g., with one or more second devices 704). In the example shown in FIG. 9, the first device 702 may be configured to transmit the AC IE 712 at a start of the round 900, prior to the start of the first slot 902(1). By transmitting the AC IE 712 via the UWB transceiver 708, which indicates availability for association with one or more second devices 704, and exchanging of association requests and responses occurring via respective UWB transceivers 708 of the first device 702 and second device(s) 704, the association and session(s) may be established "in-band", as opposed to being out-of-band through some other wireless communication technology (such as BLUETOOTH).

As shown in FIG. 9, the round 900 may include a plurality of slots 902, some of which may be used as part of ongoing sessions with second device(s) 704. For example, and as shown in FIG. 9, at least some of the slots 902(1)-902(4) may be used for transmitting data 904 (or other information, bits, etc.) between the first device 702 and one or more active second devices 704 which have an ongoing session with the first device 702. However, in various instances, some slots (e.g., slots 902(5)-902(8)) may be empty, inactive, or otherwise not in use.

In some embodiments, responsive to transmitting the AC IE 712 during the round, with the association availability field 812 set to a value indicating availability for additional association(s), the first device 702 may be configured to remain active for each slot of the round. For example, rather than entering a sleep mode (or dozing, switching to an idle state, etc.), the UWB transceiver 708 may be configured to remain in an active state for each of the inactive slots (e.g., slots 902(5)-902(8)), to receive any association request frames from a potential controlee.

Referring back to FIG. 7, in some instances, the second device 704(1) may be configured to sense, detect, identify, or otherwise receive the AC IE 712 from the first device 702 via the UWB transceiver 708 of the second device 704(1). The second device 704(1) may be configured to receive the AC IE 712 responsive to detecting the first device 702 broadcasting the AC IE 712 (e.g., at the start of a round). As described in greater detail below, the second device 704(1) may be configured to attempt to establish a session with the first device 702, according to the AC IE 712. The second device 704(1) may attempt to establish the session with the first device 702 responsive to switching to an active or on state, powering on, responsive to receiving a user input (e.g., to establish the session), etc. The second device 704(1) may include an AC IE processor 714. The AC IE processor 714 may be or include any device, component, element, or hardware designed or configured to parse, analyze, inspect, or otherwise process an AC IE 712 received from a controller device (e.g., the first device 702). In some embodiments, the AC IE processor 714 may be configured to process the AC IE 712 to determine, detect, or otherwise identify the availability for an association with the controller device. The AC IE processor 712 may be configured to parse the AC IE 712 to identify a value provided by the controller device to the association availability field 812. The AC IE processor 712 may be configured to identify the availability to establish the session with the first device 702, based on or according to the value (e.g., determine that a session is available to establish based on the value being high or "1", or may be configured to determine that a session is unavailable to establish based on the value being low or "0").

The second device 704(1) may include an association request generator 716. The association request generator 716 may be or include any device, component, element, or hardware designed or configured to establish, produce, generate, create, or otherwise configure an association request frame 718 (referred to generally as an "association request" 718) for transmission to the first device 702. The association request generator 716 may be configured to generate the association request 718 according to the value provided in the AC IE 712 by the first device 702. In this regard, the association request generator 716 may be configured to generate the association request 718, responsive to the AC IE 712 indicating that a session is available for establishing with the first device 702.

Figure 10:
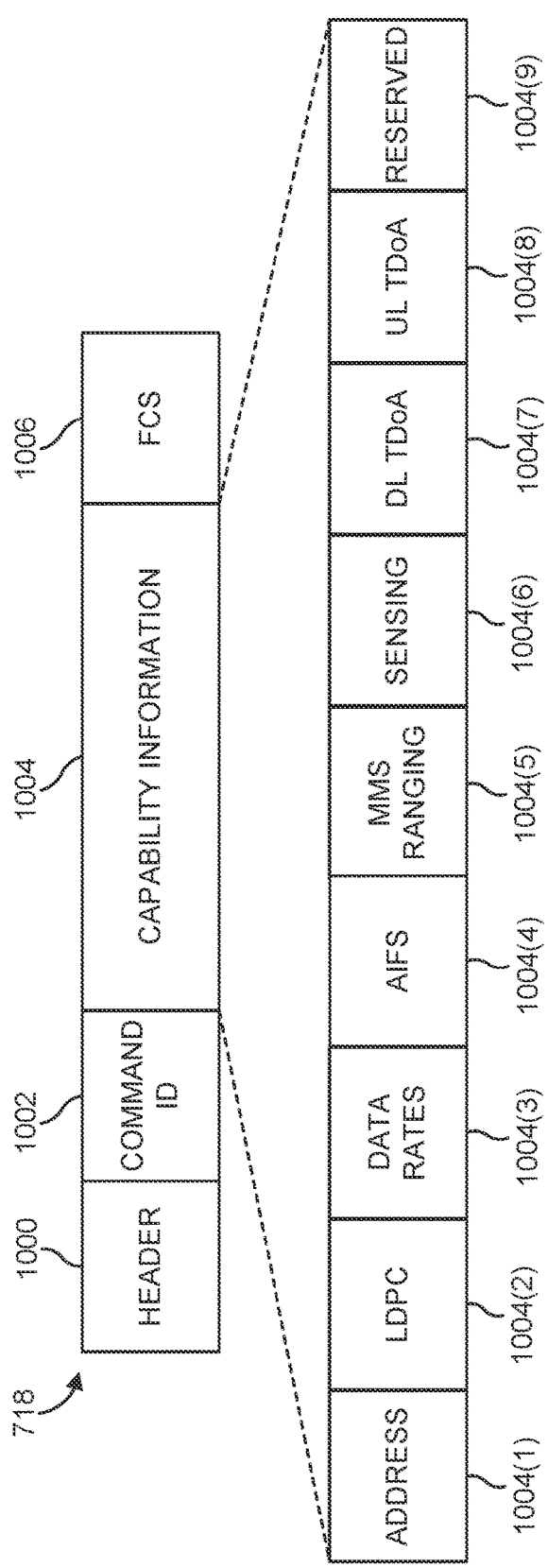
FIG. 10 is a diagram showing an example frame structure of an association request sent by a controlee of the system of FIG. 7, according to an example implementation of the present disclosure.

Referring now to FIG. 7 and FIG. 10, the association request frame 718 may include capability information of the second device 704(1). In particular, FIG. 10 is a diagram showing an example frame structure of an association request 718 sent by a controlee (e.g., the second device 704(1), according to an example implementation of the present disclosure. As shown in FIG. 10, the association request 718 may include a plurality of fields including a header field 1000, a command ID field 1002, capability information field(s) 1004, and a frame check sequence (FCS) field 1006. The header field 1000 may be or include a field for providing a medium access control (MAC) header for the association request 718. The command ID field 1002 may be or include a field for providing an identifier which indicates a type of command (e.g., a first identifier indicating the frame is an association request frame, a second identifier indicating the frame is an association response frame, etc.). The FCS field 1006 may include a field for providing a FCS, or any other error-detection code or sequence which may be used to verify the integrity of the association request frame 718.

The association request 718 may include a plurality of capability information fields 1004 for providing, indicating, or otherwise representing capabilities of the second device 704(1). In some embodiments, the capability information fields 1004 may include a first field 1004(1) for providing an address (e.g., a short address), a second field 1004(2) for indicating support for low density parity check (LDPC), a third field 1004(3) for indicating information on data rate(s), a fourth field 1004(4) for indicating an arbitration interframe space (AIFS), a fifth field 1004(5) for indicating a capability for multi-millisecond (MMS) ranging, a sixth field 1004(6) for indicating a capability for UWB sensing, a seventh field 1004(7) for indicating a capability for downlink (DL) time difference of arrival (TDoA), an eight field 1004(8) for indicating a capability for uplink (UL) TDoA, and a reserved field 1004(9) for one or more reserved bits indicating other capabilities of the second device 704(1). In some embodiments, the association request generator 716 may be configured to generate, establish, produce, or otherwise provide a short address for the second device 704. The association request generator 716 may be configured to generate the short address by assigning a random number or address for the second device 704 to use during the session with the first device 702. The association request generator 716 may be configured to provide the short address in the first field 1004(1).

The association request generator 716 may be configured to populate the capability information fields 1004 based on or according to resources to be used, executed, or otherwise supported during the session. For instance, the association request generator 716 may be configured to select or otherwise identify the capabilities to be used for the session based on an application or resource used between the devices 702, 704. For example, certain applications or resources may leverage particular capabilities, including, e.g., a voice over IP (VOIP) or other call/video conference resource may leverage data transmission or certain data rate capabilities, a gaming or virtual/augmented reality resource may leverage sensing and ranging capabilities, and so forth. The association request generator 716 may be configured to populate the capability information fields 1004 based on or according to the particular capabilities leveraged by a resource or application to be executed or supported during the session.

Similarly, the association request generator 716 may be configured to populate the capability information fields 1004 based on or according to software/hardware configurations of the second device 704. The association request generator 716 may be configured to populate the capability information fields 1004 based on particular hardware or software deployed at the second device 704. For instance, the second device 704 may or may not support LDPC, may support or use a certain AIFS (such as, e.g., 64 μs, 32 μs, or 16 μs AIFS), may support or request a certain data rate or packet header data rates (e.g., 124.8, 62.4, 31.2, 7.8 Mbps supported). The association request generator 716 may be configured to populate the capability information fields 1004 based on or according to such information. For example, the association request generator 716 may be configured to populate the second field 1004(2) with a bit set to high (or "1") where LDPC is enabled/supported, and conversely set the bit to low (or "0") where LDPC is not supported. The association request generator 716 may be configured to populate the third field 1004(3) with a value according to the data rate to be used or supported during the session (e.g., set to low, or "0", where packet header (PHY) rates—62.4, 31.2, 7.8 Mbps—are supported, or set to high, or "1", where PHY rates+124.8 Mbps are supported. Similarly, the association request generator 716 may be configured to populate the fourth field 1004(4) with a value indicating a supported AIFS. The association request generator 716 may be configured to populate the AIFS field 1004(4) with a value selected from Table 1 below.

TABLE 1

| Values for Supported AIFS field | |
|---|---|
| Supported AIFS Field Value | Supported AIFS |
| 0 | 64 μs |
| 1 | 64 μs, 32 μs |

TABLE 1-continued

| Values for Supported AIFS field | |
|---|---|
| Supported AIFS Field Value | Supported AIFS |
| 2 | 64 μs, 32 μs, 16 μs |
| 3 | Reserved |

Figure 11:
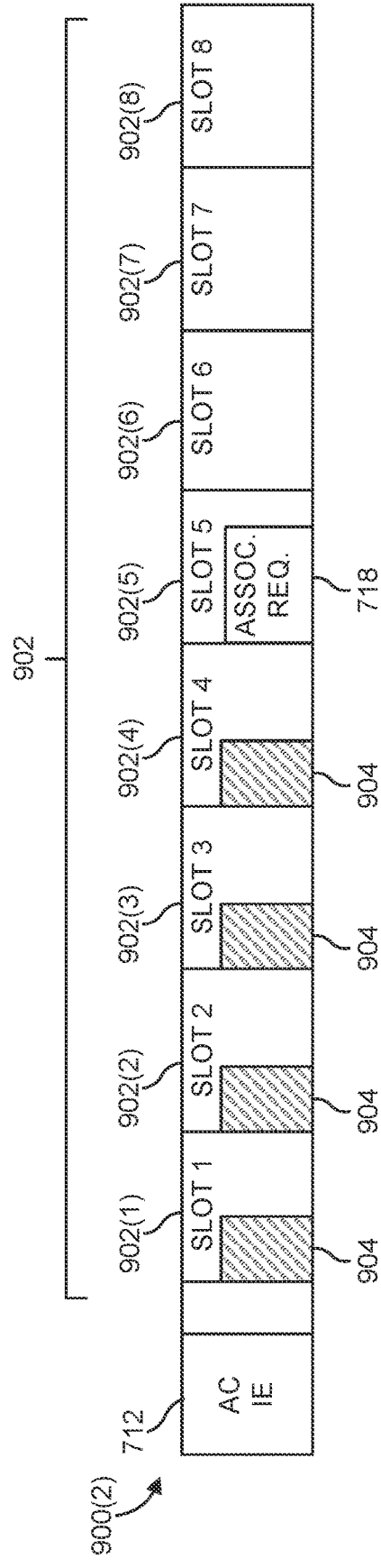
FIG. 11 is a diagram showing a second example round of slots of the controller including the association request sent by the controlee, according to an example implementation of the present disclosure.

Referring now to FIG. 7 and FIG. 11, upon generating the association request 718, the second device 704 may be configured to determine or otherwise identify a slot in which to provide the association request to the first device 702. Specifically, FIG. 11 shows an example second round of slots of the first device 702, during one of which the second device 704 transmits the association request 718 to the first device 702, according to an example implementation of the present disclosure. In some embodiments, the association request generator 716 may be configured to determine a slot in which to transmit, communicate, send, or otherwise provide the association request 718 to the first device 702.

In some embodiments, the association request generator 716, upon receiving or otherwise identifying the AC IE 712 in a round which includes an association availability field value indicating availability to establish an association with the first device 702, may perform a scan of the slots to identify an open or otherwise available slot during the round. For example, the second device 704 may be configured to perform a scanning process, to identify any unscheduled slot in the round. As shown in FIG. 11 (and as described previously with reference to FIG. 9), slots 902(5) through 902(8) may be unscheduled. The second device 704 may be configured to identify the fifth slot 902(5) (or any other slot, mini-slot, etc.) in which to communicate, transmit, or otherwise provide the association request 716 to the first device 702. The first device 702, because the UWB transceiver 708 of the first device 702 is active for each slot including those which are unscheduled responsive to indicating availability to establish an association in the AC IE 712, may be configured to receive the association request 718 in the fifth slot 902(5) sent by the second device 704.

Figure 12:
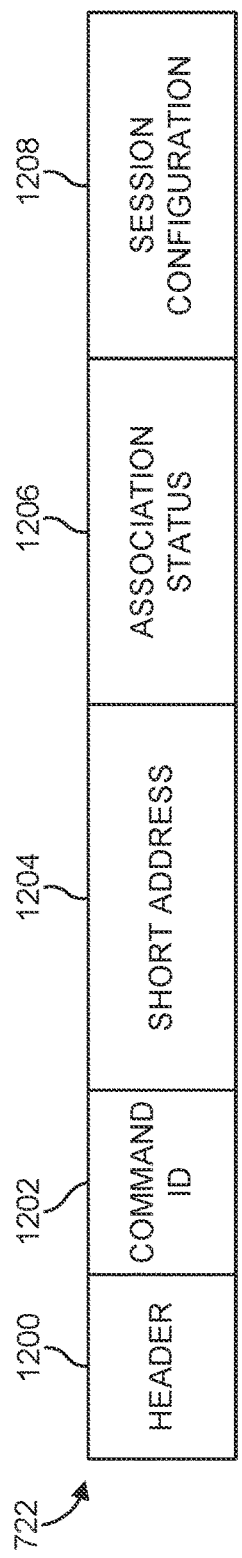
FIG. 12 is a diagram showing an example frame structure of an association response sent by the controller to the controlee, according to an example implementation of the present disclosure.

Referring now to FIG. 7 and FIG. 12, the association response generator 720 of the first device 702 may be configured to generate an association response 722, based on or according to the association request 718. Specifically, FIG. 12 shows an example frame structure of an association response 722 sent by the controller (e.g., the first device 702) to the controlee (704), according to an example implementation of the present disclosure. As shown in FIG. 12, the association response 722 may include a header field 1200, a command ID field 1202, a short address field 1204, an association status field 1206, and a session configuration field 1208. The header field 1200 and command ID field 1202 may be similar to the header field 1000 and command ID field 1002 described above with reference to FIG. 10. The association response generator 720 may be configured to populate the header field 1200 and command ID field 1202 with a corresponding header and command ID. The association response generator 720 may be configured to populate the short address field 1204 based on the short address provided in the association request 718 (e.g., either indicating acceptance or denial of the short address generated by the second device 704, providing an alternative short address, etc.).

The association response generator 1206 may be configured to populate or otherwise configure the association status field 1206 based on a status of the association request and/or the requested capability information. For example, the association response generator 1206 may be configured to populate or configure the association status field 1206 with a value selected from Table 2 below.

TABLE 2

Values for Association Status Field

| Association Status | Description |
|---|---|
| 0 | Association successful. |
| 1 | Session at capacity. |
| 2 | Short address duplication. |
| 3 | Capabilities unsupported. |
| 4 | Association denied for other reason. |
| 5-ff | Reserved |

As shown in Table 2, the association response generator 720 may be configured to indicate a successful association by providing a corresponding value in the association status field 1206 (e.g., "0"), and may indicate an unsuccessful association by providing another corresponding value in the association status field 1206. The association response generator 720 may be configured to indicate a reason or support for the unsuccessful association by selecting the corresponding value for the association field 1206 (e.g., indicating the session is at capacity by populating the field 1206 with a value of "1", indicating a duplication of a short address of the second device 704 by populating the field 1206 with a value of "2", indicating unsupported capabilities by populating the field 1206 with a value of "3", etc.).

In some embodiments, where the association response generator 720 declines or rejects the association because of unsupported capabilities requested by the second device 704, the association response generator 720 may be configured to indicate, identify, or otherwise include information relating to which capabilities are unsupported. For example, the association status field 1206 may be an octet, and the association response generator 720 may be configured to populate the association status field 1206 with values indicating which particular capabilities are unsupported (e.g., using individual bits representing capabilities similar to those shown in the capability information fields 1004 described above with reference to FIG. 10). To the extent additional capability information fields 1004 are added (e.g., via the reserved field 1004(9)), the association response frame 722 may increase in bit size (e.g., to provide additional fields for accommodating identifying additional capability unsupported fields.

The association response generator 720 may be configured to populate the session configuration field 1208 with configuration information relating to the session, responsive to successful association. In some embodiments, the association response generator 720 may be configured to populate the session configuration field 1208 with a value indicating a selected or configured AFIS. The association response generator 720 may be configured to populate or provide the selected or configured AIFS value based on the value selected by the second device 704 in the AIFS field 1004(4) of the association request. The association response generator 720 may be configured to provide the selected AIFs using a corresponding field value from Table 3 below.

TABLE 3

Values for AIFS field indicating Selected AIFS

| AIFS Field Value | AIFS |
|---|---|
| 0 | 64 µs |
| 1 | 32 µs |
| 2 | 16 µs |
| 3 | Reserved |

As shown in Table 3, for example, where the AIFS field 1004(4) of the association request 718 includes a value of "0" indicating an acceptable AIFS value of 64 µs, the association response generator 720 may be configured to populate the session configuration field 1208 with a value indicating the AIFs of 64 µs (e.g., a AIFS field value of "0"). As another example, where the AIFS field 1004(4) of the association request 718 includes a value of "3" indicating acceptable AIFS values of 64 µs, 32 µs, or 16 µs, the association response generator 720 may be configured to populate the session configuration field 1208 with a value indicating any of the selected AIFS.

Figure 13:
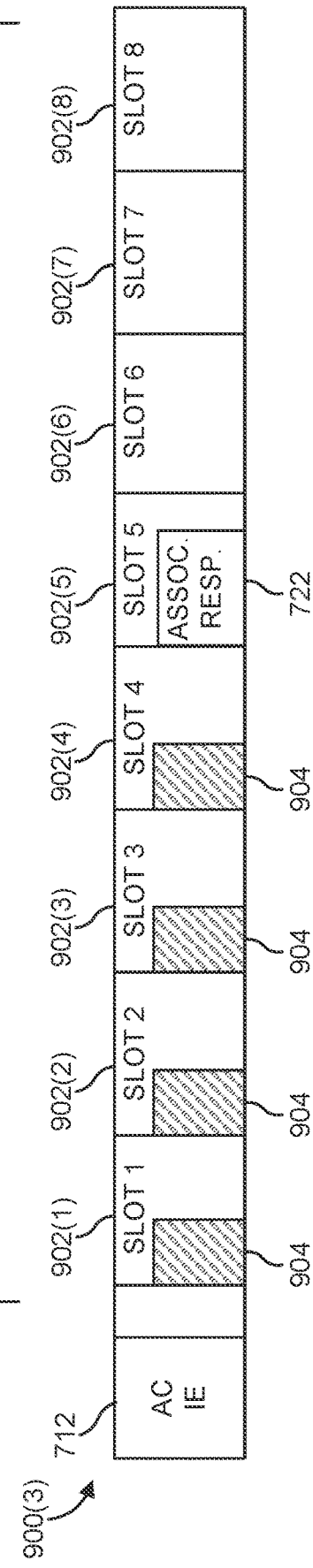
FIG. 13 is a diagram showing a third example round of slots of the controller including the association response sent by the controller, according to an example implementation of the present disclosure.

Referring to FIG. 7 and FIG. 13, once the association response generator 720 generates or otherwise configures the association response 722, the first device 702 may be configured to communicate, transmit, send, or otherwise provide the association response 722 back to the second device 704. Specifically, FIG. 13 shows an example third round of slots of the first device 702, during one of which the first device 702 transmits the association response 722 to the second device 704, according to an example implementation of the present disclosure. In some embodiments, the first device 702 may be configured to communicate or otherwise transmit the association response 722 to the second device 704 in the same slot (e.g., of a subsequent round) in which the first device 702 received the association request 718. Continuing the example shown in FIGS. 9, 11, and 13, the first device 702 may be configured to communicate the association response 722 in the fifth slot 902(5), which is the same slot in which the first device 702 received the association request 718 (as shown in FIG. 11).

It is noted that, while particular frame formats are illustrated in FIG. 8, FIG. 10, and FIG. 12, it should be understood that the present disclosure is not limited to the particular order or contents of the frame formats. Rather, these formats are intended to be examples of frames which could be used for an AC IE 712, association request 718, and association response 722 in various embodiments of the present disclosure.

Figure 14:
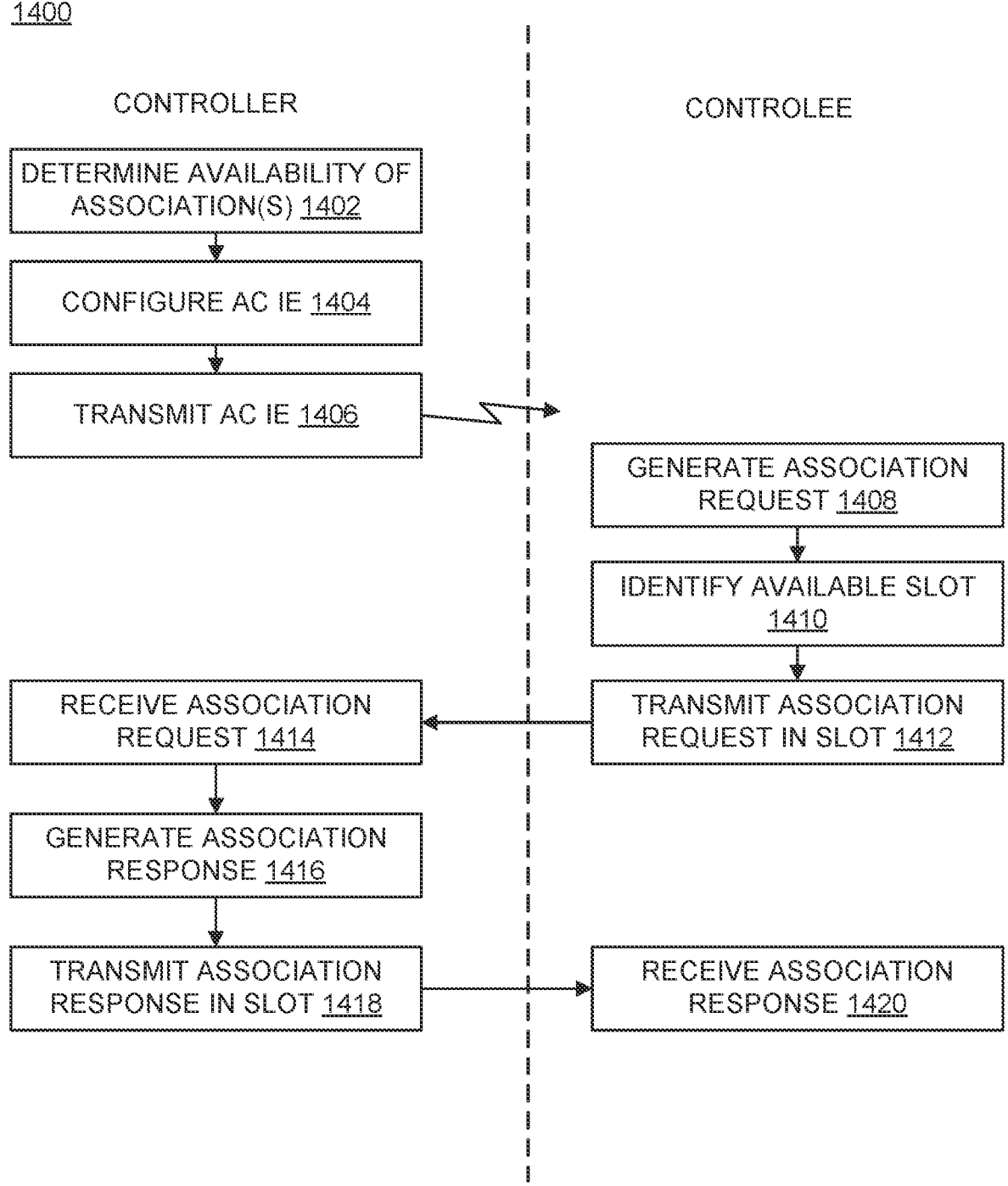
FIG. 14 is a flowchart showing an example method for ultra-wideband in-band discovery, according to an example implementation of the present disclosure.

Referring now to FIG. 14, depicted is a flowchart showing an example method 1400 for ultra-wideband in-band discovery, according to an example implementation of the present disclosure. The method 1400 may be performed by various devices, components, or elements described above with reference to FIG. 1-FIG. 13. In some embodiments, some steps or processes of the method 1400 may be performed by one device (such as the first device 702), and other steps or processes of the method 1400 may be performed by another device (such as the second device 704). The method is described with reference to a controller and a controlee, though it should be understood that the controller may be a controller device (or the first device), and the controlee may be a controlee device (or the second device).

At step 1402, a controller may determine availability of associations. In some embodiments, the controller may determine an availability of associations with one or more potential controlees. The controller may determine the availability based on current resources used or attributable to ongoing sessions maintained by the controller with existing controlees. The controller may determine the availability responsive to establishing new sessions or associations. The controller may determine the availability responsive to or prior to beginning a new round with existing controlees. The controller may determine the availability prior to generating an application control information element. The controller may determine the availability, to provide such information to potential controlees in an environment of the controller. The controller may determine the availability by applying current resources (e.g., bandwidth, slots, etc.) dedicated to, assigned to, or otherwise attributed to active sessions to a threshold criteria or criterion. The controller may determine the availability based on a comparison of the current resources to the threshold. For example, the controller may determine that additional associations are available based on the current resources satisfying the threshold (e.g., one or more slots are available, available bandwidth, etc.).

At step 1404, the controller may configure an application control (AC) information element (IE). In some embodiments, the controller may configure the AC IE based on or according to the availability of associations determined at step 1402. For example, the AC IE may include various fields for providing control information relating to ongoing sessions. The AC IE may also include at least one field indicating an association availability. The controller may configure the AC IE to indicate or otherwise identify the determined availability for associations by potential controlees with the controller. In other words, the controller may configure the AC IE, which has an association availability field, with a value to indicate the availability of an association with the controller and a potential controlee.

At step 1406, the controller may transmit the AC IE. In some embodiments, the controller may transmit the AC IE at the start of a round as part of ongoing session(s) with other controlees. The controller may transmit the AC IE as a first frame, packet, or element of the round, followed by a plurality of slots corresponding to the round. In some embodiments, for each round, the controller may repeat steps 1402-1406 (e.g., to determine the availability, configure the AC IE, and transmit the AC IE). The controller may transmit the AC IE on a channel for ongoing session(s) with current controlees.

In some instances, a potential controlee may receive the AC IE. The controlee may receive the AC IE by performing a scan of each channel and preamble code, to identify the AC IE transmitted at the beginning of the round by a controller. The controlee may perform the scan responsive to determining to establish an association with the controller. For example, the controlee may determine to attempt establishing the association responsive to the controlee powering on, responsive to receiving a user input to establish a session with the controller, responsive to launching an application or resource which triggers establishing the association, and so forth. The controlee may receive the AC IE during or as part of the scan, responsive to the controller transmitting the AC IE at the beginning of the round. The controlee may parse the AC IE to determine, detect, or otherwise identify a value in the AC IE indicating the availability for an association with the controlee.

At step 1408, a controlee may generate an association request. The controlee may generate the association request, responsive to the ACI IE indicating the availability for an association with the controller. The controlee may generate the association request by populating various fields with values indicating, for instance, capability information, requested configuration settings for the session, and so forth. The capability information may include support for low density parity check (LDPC), a data rate or supported data rates, an arbitration interframe space (AIFS) or available/supported AIFS, support for multi-millisecond (MMS) ranging, support for sensing, support for downlink time difference of arrival (TDoA), and/or support for uplink TDoA. The controlee may generate the association request based on configurations of the controlee and/or based on resource demands/requirements/needs/settings for an application or resource executing on or otherwise supported by the controlee during the session with the controller.

At step 1410, the controlee may identify/determine an available slot. In some embodiments, the controlee may identify an available slot in which to send, communicate, or otherwise transmit the association request to the controller. The controlee may identify the available slot by performing a scan of each of the slots in the round, to identify or otherwise determine an unoccupied or otherwise available slots (e.g., a slot which is currently not in use by a controlee as part of an active session with the controller). The controller may select or otherwise identify the available slot from the identified available slots. For example, the controller may select the available slot as the first available slot, as any available slot, as any sub-slot, etc. At step 1412, the controlee may transmit the association request in the slot. In some embodiments, the controlee may transmit the association request to the controller in the slot selected at step 1410. The controlee may transmit the association request to the controller, to attempt to establish an association with the controller. The controlee may transmit the association request in the available slot of a subsequent round (e.g., subsequent to the round in which the controlee received the AC IE from the controller).

At step 1414, the controller may receive the association request. In some embodiments, the controller may receive the association request from the controlee in an available slot of a round. In some embodiments, according to the AC IE configured at step 1404 and transmitted at step 1406, the controller may remain active for each slot of the round, regardless of whether or not the slot is available or unavailable. The controlee may maintain an active state for each available slot for receipt of any association requests from potential controlees. The controlee may maintain in the active state according to the association availability configured in the AC IE. The controller may receive the association request from the controlee responsive to maintaining in the active state.

At step 1416, the controller may generate an association response. In some embodiments, the controller may generate the association response, based on or according to the association request received at step 1414. The controller may generate the association response to indicate an association status of the association request. Thus, the association response may include an association field including a value which indicates the association status. The association status may include, for example, a successful association, a session at capacity, a rejected short address, etc. The controller may configure the association response based on or according to whether the controller accepts the configuration information provided in the association request (e.g., including the capability information). The controller may configure the association response to indicate whether or not the association was successful. Where the association was unsuccessful, the controller may configure the association response to provide a basis for the unsuccessful association.

At step 1418, the controller may transmit the association response in the slot. In some embodiments, the controller may transmit the association response to the controlee. The controller may transmit the association response in the slot (e.g., of a subsequent round) in which the controlee sent the association request to the controller. The controller may transmit the association response according to the association request. The controller may transmit the association response, to indicate successful or unsuccessful association between the controller and controlee.

At step 1420, the controlee may receive the association response. In some embodiments, the controlee may receive the association response in the same slot (e.g., a subsequent round) in which the controlee sent the association request. In instances where the association response indicates successful association, the controlee may exchange various data/information/packets/etc. with the controller on the session established as part of the association. In this regard, the controller and controlee may establish a session according to the association request and association response. Where the association response indicates an unsuccessful association, in some embodiments, the controlee may reattempt association (e.g., using different configuration details or capability information) with the controller. In some embodiments, the controlee may attempt association with a different controller responsive to the association response indicating an unsuccessful association.

Having now described some illustrative implementations, it is apparent that the foregoing is illustrative and not limiting, having been presented by way of example. In particular, although many of the examples presented herein involve specific combinations of method acts or system elements, those acts and those elements can be combined in other ways to accomplish the same objectives. Acts, elements and features discussed in connection with one implementation are not intended to be excluded from a similar role in other implementations or implementations.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit and/or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular can also embrace implementations including a plurality of these elements, and any references in plural to any implementation or element or act herein can also embrace implementations including only a single element. References in the singular or plural form are not intended to limit the presently disclosed systems or methods, their components, acts, or elements to single or plural configurations. References to any act or element being based on any information, act or element can include implementations where the act or element is based at least in part on any information, act, or element.

Any implementation disclosed herein can be combined with any other implementation or embodiment, and references to "an implementation," "some implementations," "one implementation" or the like are not necessarily mutually exclusive and are intended to indicate that a particular feature, structure, or characteristic described in connection with the implementation can be included in at least one implementation or embodiment. Such terms as used herein are not necessarily all referring to the same implementation. Any implementation can be combined with any other implementation, inclusively or exclusively, in any manner consistent with the aspects and implementations disclosed herein.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Systems and methods described herein may be embodied in other specific forms without departing from the characteristics thereof. References to "approximately," "about" "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

The term "coupled" and variations thereof includes the joining of two members directly or indirectly to one another. Such joining may be stationary (e.g., permanent or fixed) or moveable (e.g., removable or releasable). Such joining may be achieved with the two members coupled directly with or to each other, with the two members coupled with each other using a separate intervening member and any additional intermediate members coupled with one another, or with the two members coupled with each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References to "or" can be construed as inclusive so that any terms described using "or" can indicate any of a single, more than one, and all of the described terms. A reference to "at least one of 'A' and 'B'" can include only 'A', only 'B', as well as both 'A' and 'B'. Such references used in conjunction with "comprising" or other open terminology can include additional items.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

References herein to the positions of elements (e.g., "top," "bottom," "above," "below") are merely used to describe the orientation of various elements in the FIGURES. The orientation of various elements may differ according to other exemplary embodiments, and that such variations are intended to be encompassed by the present disclosure.

What is claimed is:

1. A method, comprising:
    receiving, by a first ultra-wideband (UWB) device from a second UWB device, an application control (AC) information element (IE) including an association availability field having a value indicating availability of an association between the first UWB device and the second UWB device;
    selecting, by the first UWB device, an available slot in which to transmit an association request to the second UWB device; and
    transmitting, by the first UWB device, the association request to the second UWB device in the available slot.

2. The method of claim 1, wherein the association request comprises a high-rate pulse repetition frequency (HRP) association request command, and wherein the HRP association request includes a scheduling mode to be used for the association request.

3. The method of claim 1, wherein the second UWB device remains in an active state for each slot including the available slot, responsive to providing the value in the association availability field.

4. The method of claim 1, wherein the association request includes capability information of the first UWB device.

5. The method of claim 4, wherein the capability information comprises at least one of i) support for low density parity check (LDPC), ii) a data rate, or iii) an arbitration interframe space (AIFS).

6. The method of claim 5, wherein the AIFS comprises a field having an AIFS value corresponding to a supported AIFS comprising at least one of 64 µs, 32 µs, or 16 µs.

7. The method of claim 4, wherein the capability information further comprises at least one of i) multi-millisecond (MMS) ranging, ii) sensing, iii) downlink time difference of arrival (TDoA), or iv) uplink TDoA.

8. The method of claim 1, further comprising receiving, by the first UWB device, an association response from the second UWB device.

9. The method of claim 8, wherein the association response comprises a field having an association status value indicating at least one of i) a successful association, ii) session at capacity, or iii) a rejected short address of the first UWB device.

10. A first device comprising:
    a first UWB transceiver; and
    one or more processors configured to:
        receive, via the first UWB transceiver from a second UWB transceiver of a second device, an application control (AC) information element (IE) including an association availability field having a value indicating availability of an association between the first device and the second device;
        select an available slot in which to transmit an association request to the second device; and
        transmit, via the first UWB transceiver, then association request to the second device.

11. The first device of claim 10, wherein the association request comprises a high-rate pulse repetition frequency (HRP) association request command, and wherein the HRP association request includes a scheduling mode to be used for the association request.

12. The first device of claim 10, wherein the second UWB transceiver of the second device remains in an active state for each slot including the available slot, responsive to providing the value in the association availability field.

13. The first device of claim 10, wherein the association request includes capability information of the first device.

14. The first device of claim 13, wherein the capability information comprises at least one of i) support for low density parity check (LDPC), ii) a data rate, or iii) an arbitration interframe space (AIFS).

15. The first device of claim 14, wherein the AIFS comprises a field having an AIFS value corresponding to a supported AIFS comprising at least one of 64 µs, 32 µs, or 16 µs.

16. The first device of claim 14, wherein the capability information further comprises at least one of i) multi-millisecond (MMS) ranging, ii) sensing, iii) downlink time difference of arrival (TDoA), or iv) uplink TDoA.

17. The first device of claim 10, wherein the one or more processors are further configured to receive, via the first UWB transceiver from the second UWB transceiver of the second device, an association response from the second device.

18. The first device of claim 17, wherein the association response comprises a field having an association status value indicating at least one of i) a successful association, ii) session at capacity, or iii) a rejected short address of the first device.

19. A method comprising:
    transmitting, by a first ultra-wideband (UWB) device, an application control (AC) information element (IE) including an association availability field having a value indicating availability of an association with the first UWB device;
    receiving, by the first UWB device from a second UWB device, in an available slot, an association request transmitted by the second UWB device responsive to the AC IE; and
    transmitting, by the first UWB device to the second UWB device, an association response to the second UWB device according to the association request.

20. The method of claim 19, further comprising maintaining, by the first UWB device, according to the AC IE, an active state of the first UWB device for each available slot of a round for receipt of any association requests from second UWB devices.

* * * * *